US012460975B2

(12) United States Patent
Nagasawa

(10) Patent No.: US 12,460,975 B2
(45) Date of Patent: Nov. 4, 2025

(54) TEMPERATURE MEASUREMENT DEVICE AND QUALITY CONTROL SYSTEM

(71) Applicant: MEDIPAL HOLDINGS CORPORATION, Tokyo (JP)

(72) Inventor: Kazunori Nagasawa, Tokyo (JP)

(73) Assignee: MEDIPAL HOLDINGS CORPORATION, Tokyo (JP)

( * ) Notice: Subject to any disclaimer, the term of this patent is extended or adjusted under 35 U.S.C. 154(b) by 484 days.

(21) Appl. No.: 17/310,947

(22) PCT Filed: Feb. 25, 2020

(86) PCT No.: PCT/JP2020/007517
§ 371 (c)(1),
(2) Date: Sep. 1, 2021

(87) PCT Pub. No.: WO2020/184171
PCT Pub. Date: Sep. 17, 2020

(65) Prior Publication Data
US 2022/0042854 A1 Feb. 10, 2022

(30) Foreign Application Priority Data

Mar. 8, 2019 (JP) .................. 2019-042752

(51) Int. Cl.
*G01K 3/00* (2006.01)
*G01K 1/024* (2021.01)
(Continued)

(52) U.S. Cl.
CPC ............. *G01K 3/005* (2013.01); *G01K 1/024* (2013.01); *G01K 1/14* (2013.01); *G06K 19/0723* (2013.01)

(58) Field of Classification Search
CPC .......... G01K 3/005; G01K 1/024; G01K 1/14; G01K 1/022; G06K 19/0723; G06K 19/0717
See application file for complete search history.

(56) References Cited

U.S. PATENT DOCUMENTS

2006/0208881 A1    9/2006  Suzuki
2008/0197969 A1 *  8/2008  Vogt ..................... G06Q 10/00
                                                    340/5.8
(Continued)

FOREIGN PATENT DOCUMENTS

CA      3068334 A1 *  1/2019  ............. G06F 1/163
CN      1833962 A     9/2006
(Continued)

OTHER PUBLICATIONS

International Society for Biological and Environmental Repositories (ISBER). "Best practices for repositories I: Collection, storage, and retrieval of human biological materials for research." Cell Preservation Technology 3, No. 1 (2005): 5-48 (Year: 2005).*
(Continued)

*Primary Examiner* — Douglas Kay
(74) *Attorney, Agent, or Firm* — MASUVALLEY & PARTNERS; Peter Martinez

(57) ABSTRACT

A temperature measurement device 25A is a temperature measurement device 25A that includes a temperature sensor 25d and that is accommodated in a container 21 along with an article 23, and includes a temperature deviation determination unit 25h that determines whether a temperature of the article 23 in the container 21 having been detected by the temperature sensor 25d at a predetermined measurement interval has deviated from a reference temperature range, a control unit 25g that enables a temperature deviation flag when the number of times the temperature of the article 43 in the container 21 has consecutively deviated from the
(Continued)

reference temperature range exceeds a reference number as a result of determination by the temperature deviation determination unit 25h, and a notification unit 25f that notifies a fact that the temperature deviation flag has been enabled by the control unit 25g.

2 Claims, 34 Drawing Sheets

(51) Int. Cl.
  *G01K 1/14* (2021.01)
  *G06K 19/07* (2006.01)

(56) References Cited

U.S. PATENT DOCUMENTS

| | | | |
|---|---|---|---|
| 2012/0114010 A1* | 5/2012 | Branch | G01K 3/04 |
| | | | 374/E1.001 |
| 2014/0269812 A1* | 9/2014 | Deutscher | G01K 7/18 |
| | | | 374/1 |
| 2017/0056289 A1* | 3/2017 | Tsuno | F25D 11/00 |
| 2018/0156645 A1 | 6/2018 | Geboers | |
| 2019/0011965 A1* | 1/2019 | Seyed | G06F 1/206 |
| 2020/0132362 A1* | 4/2020 | Ito | B65G 61/00 |

FOREIGN PATENT DOCUMENTS

| | | | | |
|---|---|---|---|---|
| FR | 3060118 A1 | * | 6/2018 | A61J 1/18 |
| JP | H10-104089 A | | 4/1998 | |
| JP | 2003-038468 A | | 2/2003 | |
| JP | 2003063570 A | * | 3/2003 | |
| JP | 2004307099 A | * | 11/2004 | |
| JP | 2017-078967 A | | 4/2017 | |
| WO | WO-2019030969 A1 | * | 2/2019 | B07C 5/34 |

OTHER PUBLICATIONS

Kim, Do-Sung, and et al. "Location based blood bag management using active RFID and ubiquitous sensor network." In 2007 6th International Special Topic Conference on Information Technology Applications in Biomedicine, pp. 320-322. IEEE, 2007 (Year: 2007).*

WIPO, Japanese International Search Authority, International Search Report (with English translation) and Written Opinion mailed May 26, 2020, in International Patent Application No. PCT/JP2020/007517, 8 pages.

EPO, extended European Search Report issued on Nov. 18, 2022, in European Patent Application No. 20770714.2, 11pages.

CNIPA, Chinese Office Action issued on Sep. 28, 2023, in Chinese Patent Application No. 202080017824.3, 12 pages.

* cited by examiner

FIG.1 [SYSTEM CONFIGURATION DIAGRAM]
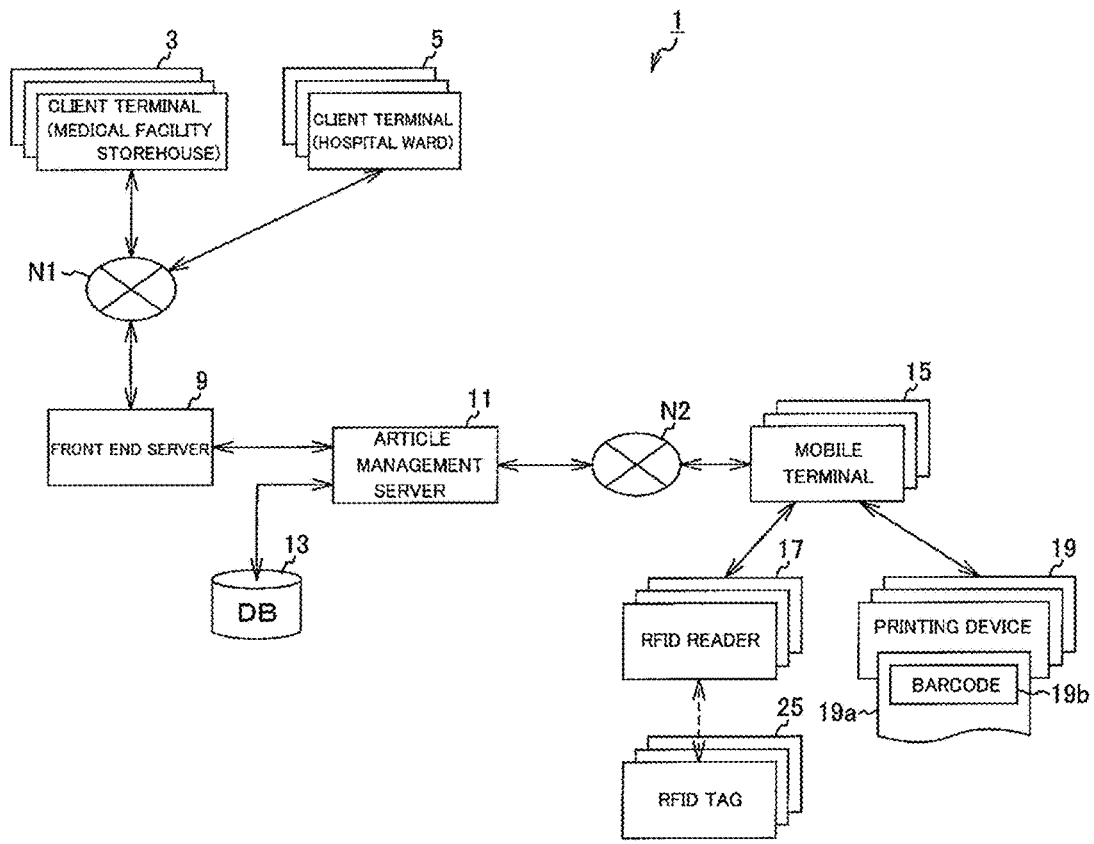
FIG.2 [PERSPECTIVE VIEW OF PACKAGING]
(a) DRAWING
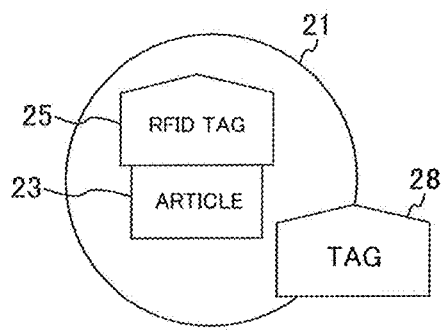
(b) ACTUAL PHOTOGRAPH
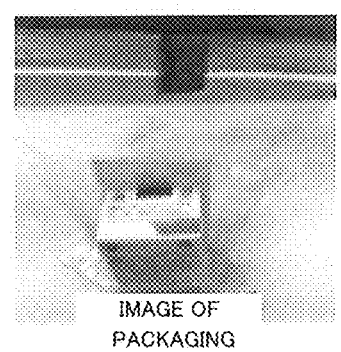
IMAGE OF PACKAGING

FIG.3
[HARDWARE CONFIGURATION DIAGRAM OF RFID TAG]
(a)
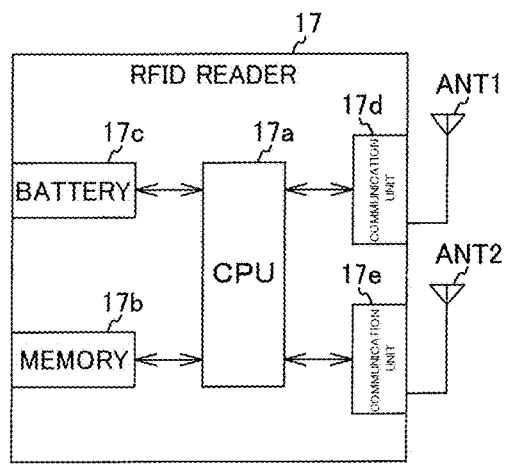
(b)
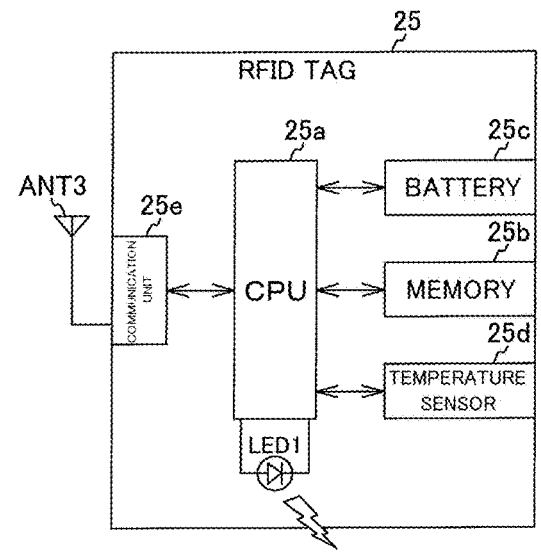

FIG.4 [DIAGRAM CORRESPONDING TO CLAIMS]

FIG.5 [FLOWCHART OF OVERALL TASK]

[FLOWCHART OF STORAGE TASK IN MEDICAL FACILITY (HOSPITAL WARD)]

[FLOWCHART OF DISPATCHING TASK FROM MEDICAL FACILITY (HOSPITAL WARD)]

FIG.12    [CAPTURED SCREEN OF MOBILE TERMINAL]

(a) MENU SCREEN

TEMPERATURE MONITORING  Ver 1.0  — G1

HOSPITAL STOREHOUSE

- TEMPERATURE MONITORING START
- TEMPERATURE DETERMINATION
- MASTER SETTING

ADMINISTRATOR

(b) TEMPERATURE MONITORING START SCREEN

TEMPERATURE MONITORING  Ver 1.0  — G3

HOSPITAL STOREHOUSE DISPATCH

PRODUCT BARCODE

RFID

- RFID READ
- START

(c) TEMPERATURE DETERMINATION SCREEN

TEMPERATURE MONITORING  Ver 1.0  — G5

HOSPITAL STOREHOUSE

- WARD 6A STORAGE ●
- WARD 6B STORAGE ○
- STOREHOUSE RETURN ○

DETERMINATION  — G5a

(d) MASTER SETTING SCREEN

TEMPERATURE MONITORING  Ver 1.0  — G7

HOSPITAL STOREHOUSE DISPATCH

RFID

| UPPER TEMPERATURE THRESHOLD | LOWER TEMPERATURE THRESHOLD |
| NUMBER OF TIMES OF OVERTHRESHOLD | MEASUREMENT INTERVAL ...SEC. |

- READ SETTING
- READ SETTING

[FLOWCHART OF TEMPERATURE DEVIATION DETERMINATION OF MOBILE TERMINAL]

FIG.16

[GRAPH AND TABLE OF TEMPERATURE DEVIATION]

(a)

| MEASUREMENT TIME | 9:00 | 9:01 | 9:02 | 9:03 | 9:04 | 9:05 | 9:06 | 9:07 | 9:08 | 9:09 | 9:10 | 9:11 | 9:12 | 9:13 | 9:14 | 9:15 | 9:16 |
|---|---|---|---|---|---|---|---|---|---|---|---|---|---|---|---|---|---|
| TEMPERATURE (C°) | 5.4 | 5.3 | 5.8 | 6.5 | 8.2 | 7.0 | 6.2 | 6.5 | 7.3 | 8.3 | 8.2 | 8.4 | 7.8 | 7.3 | 6.5 | 5.3 | 5.4 |
| UPPER TEMPERATURE THRESHOLD (C°) | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 |
| LOWER TEMPERATURE THRESHOLD (C°) | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| NUMBER OF TEMPERATURE DEVIATIONS | 0 | 0 | 0 | 0 | 1 | 0 | 0 | 0 | 0 | 1 | 2 | 3 | 3 | 3 | 3 | 3 | 3 |
| TEMPERATURE DEVIATION FLAG | 0 | 0 | 0 | 0 | 0 | 0 | 0 | 0 | 0 | 0 | 0 | 1 | 1 | 1 | 1 | 1 | 1 |

(b)

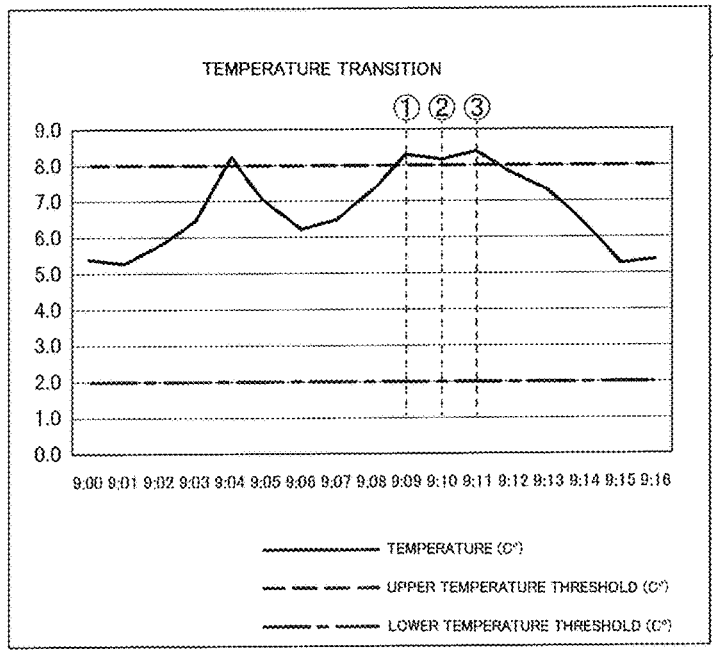

[SETTING CONTENTS]
UPPER TEMPERATURE THRESHOLD: 8C°
LOWER TEMPERATURE THRESHOLD: 2C°
NUMBER OF OVERTHRESHOLDS: THREE TIMES
MEASUREMENT INTERVAL: 1 MINUTE

FIG.17

[DEVIATION THRESHOLD ER DIAGRAM]

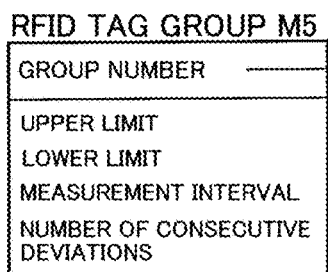
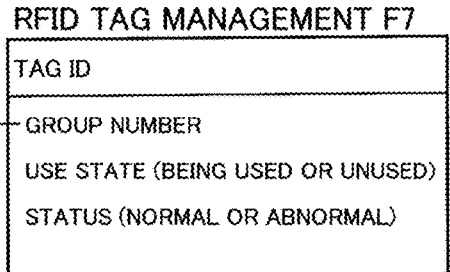

[TRACEABILITY SEQUENCE DIAGRAM]

FIG.19

[TRACEABILITY SEQUENCE SCREEN]

(a) TRACEABILITY (LIST) SCREEN

TOP MENU  TEMPERATURE MANAGEMENT INFORMATION (LIST)  G11

TEMPERATURE MANAGEMENT INFORMATION (LIST)

HOSPITAL NAME [ ▼ ]

DATE [        ] ~ [        ] [SEARCH]

DETERMINATION [ ▼ ]

SEARCH REFINEMENT

CSV OUTPUT (b)

1

G13

| DATE | PRODUCT NAME | TRANSPORTATION STATE | STATUS |
|---|---|---|---|
| 2019/01/30 | | ADMINISTRATION | ABNORMAL |
| 2019/01/30 | | WARD 6A STORAGE | NORMAL |
| 2019/01/30 | | MONITORING START | NORMAL |
| 2019/01/29 | | MONITORING START | NORMAL |
| 2019/01/29 | | ADMINISTRATION | ABNORMAL |
| 2019/01/28 | | STOREHOUSE RETURN | NORMAL |
| 2019/01/28 | | STOREHOUSE RETURN | NORMAL |
| 2019/01/28 | | STOREHOUSE RETURN | NORMAL |
| 2019/01/28 | | STOREHOUSE RETURN | NORMAL |

FIG.20

[TRACEABILITY (DETAILS) SCREEN]

TOP MENU  TEMPERATURE MANAGEMENT INFORMATION (LIST)  TEMPERATURE MANAGEMENT INFORMATION (DETAIL)  G15

TEMPERATURE MANAGEMENT INFORMATION (DETAIL)

[HOSPITAL NAME]  [TAG No  8000000001749000187010]  [CHECK TEMPERATURE HISTORY]

| DATE | PRODUCT NAME | PDA NAME | TRANSPORTATION STATE | STATUS | TEMPERATURE DEVIATION TIME |
|---|---|---|---|---|---|
| 2019/01/30 12:35:01 | | HOSPITAL STOREHOUSE | MONITORING START | NORMAL | |
| 2019/01/30 12:42:34 | | WARD 6A | WARD 6A STORAGE | NORMAL | |
| 2019/01/30 12:43:26 | | WARD 6A | WARD 6A STORAGE | NORMAL | |
| 2019/01/30 12:43:37 | | WARD 6A | WARD 6A STORAGE | NORMAL | |
| 2019/01/30 12:43:58 | | WARD 6A | WARD 6A STORAGE | ABNORMAL | 2019/01/30 12:43:40 |

FIG.21 [ER DIAGRAM]
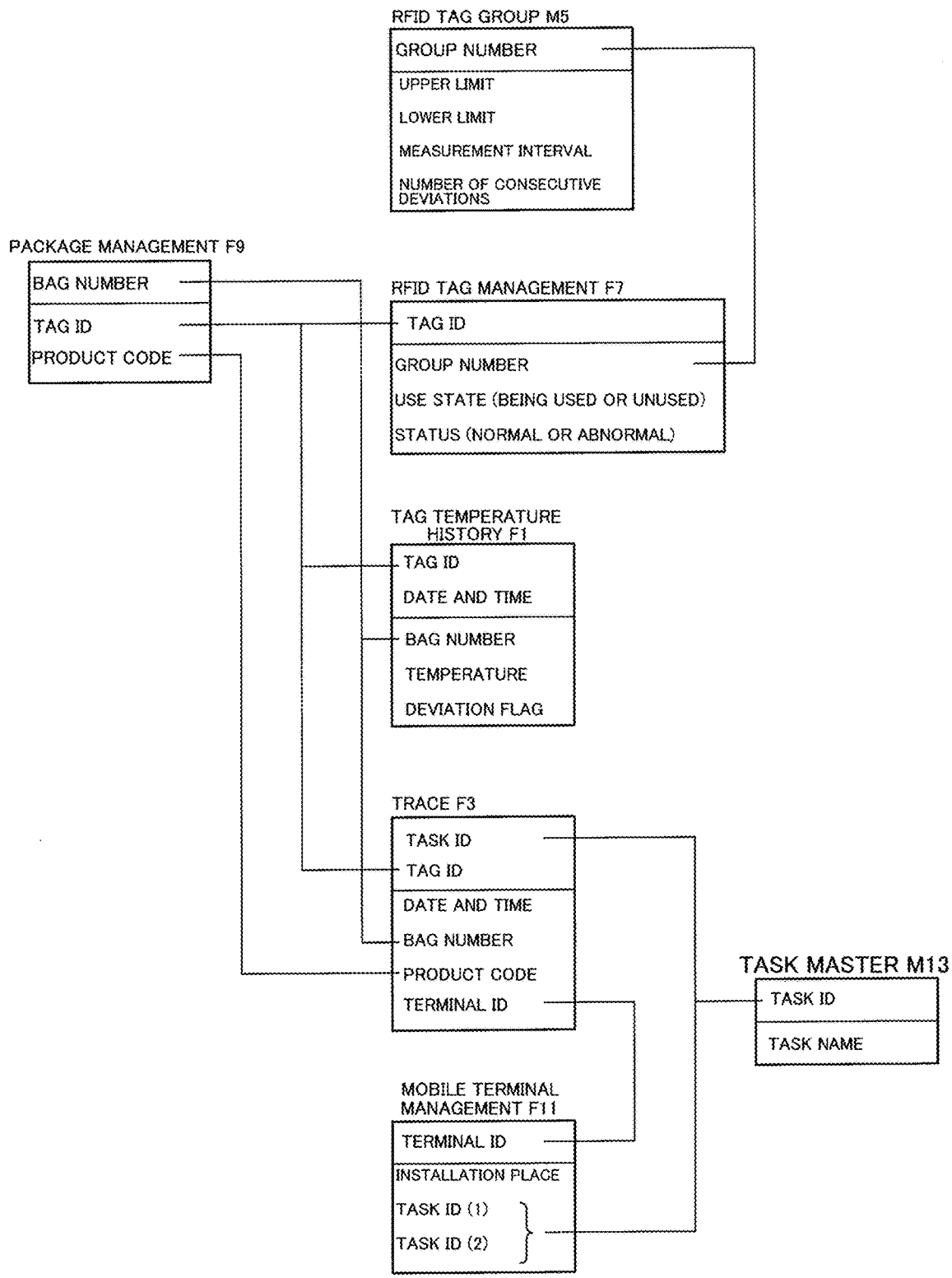

FIG.25 [FLOWCHART OF OVERALL TASK]

[FLOWCHART OF TASK FROM SHIPMENT FROM MEDICAL PRODUCT DISTRIBUTOR TO STORAGE INTO MEDICAL FACILITY]

[FLOWCHART OF TASK FROM SHIPMENT FROM MEDICAL PRODUCT DISTRIBUTOR TO STORAGE INTO MEDICAL FACILITY (STOREHOUSE)]

[CONFIGURATION DIAGRAM OF ACQUISITION OF TEMPERATURE DATA]

[FLOWCHART OF QUALITY CERTIFICATION OUTPUT]

FIG.33
[TEMPERATURE QUALITY CERTIFICATION]
(a)
(b)
(c)
(d)
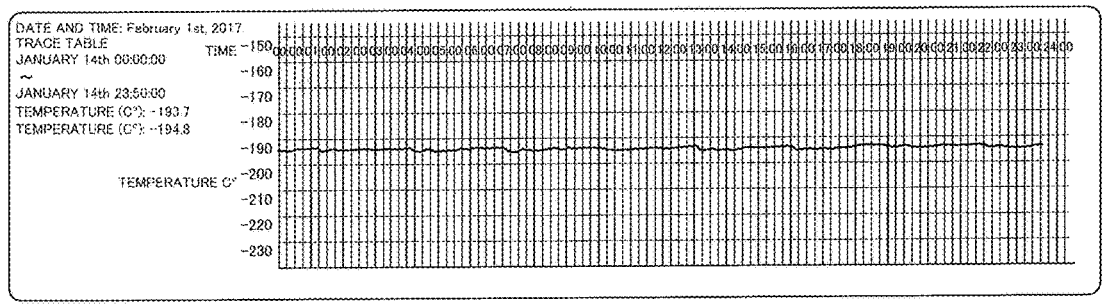

FIG.35 [TRACEABILITY SCREEN]

(a) TRACEABILITY (LIST) SCREEN

TOP MENU  TEMPERATURE MANAGEMENT INFORMATION (LIST) — G17

TEMPERATURE MANAGEMENT INFORMATION (LIST)

HOSPITAL NAME: [▼]
DATE: [       ] ~ [       ] [SEARCH] — B21
DETERMINATION: [▼] — E1
[SEARCH REFINEMENT] — B23
[CSV OUTPUT]

(b)

[1]  — G19

| DATE | PRODUCT NAME | TRANSPORTATION STATE | STATUS |
|---|---|---|---|
| 2019/01/30 | | ADMINISTRATION | ABNORMAL |
| 2019/01/30 | | WARD 6A STORAGE | NORMAL |
| 2019/01/30 | | MONITORING START | NORMAL |
| 2019/01/29 | | MONITORING START | NORMAL |
| 2019/01/29 | | ADMINISTRATION | ABNORMAL |
| 2019/01/28 | | STOREHOUSE RETURN | NORMAL |
| 2019/01/28 | | STOREHOUSE RETURN | NORMAL |
| 2019/01/28 | | STOREHOUSE RETURN | NORMAL |
| 2019/01/28 | | STOREHOUSE RETURN | NORMAL |

FIG.36 [TRACEABILITY (DETAILS) SCREEN]

TOP MENU  TEMPERATURE MANAGEMENT INFORMATION (LIST)  TEMPERATURE MANAGEMENT INFORMATION (DETAIL) — G21

TEMPERATURE MANAGEMENT INFORMATION (DETAIL)

[HOSPITAL NAME]  [TAG No] 800000000174900018 7010  [CHECK TEMPERATURE HISTORY] — B25

| DATE | PRODUCT NAME | PDA NAME | TRANSPORTATION STATE | STATUS | TEMPERATURE DEVIATION TIME |
|---|---|---|---|---|---|
| 2019/01/30 12:35:01 | | HOSPITAL STOREHOUSE | MONITORING START | NORMAL | |
| 2019/01/30 12:42:34 | | WARD 6A | WARD 6A STORAGE | NORMAL | |
| 2019/01/30 12:43:26 | | WARD 6A | WARD 6A STORAGE | NORMAL | |
| 2019/01/30 12:43:37 | | WARD 6A | WARD 6A STORAGE | NORMAL | |
| 2019/01/30 12:43:58 | | WARD 6A | WARD 6A STORAGE | ABNORMAL | 2019/01/0 12:43:40 |

FIG.37
[TEMPERATURE HISTORY SCREEN]
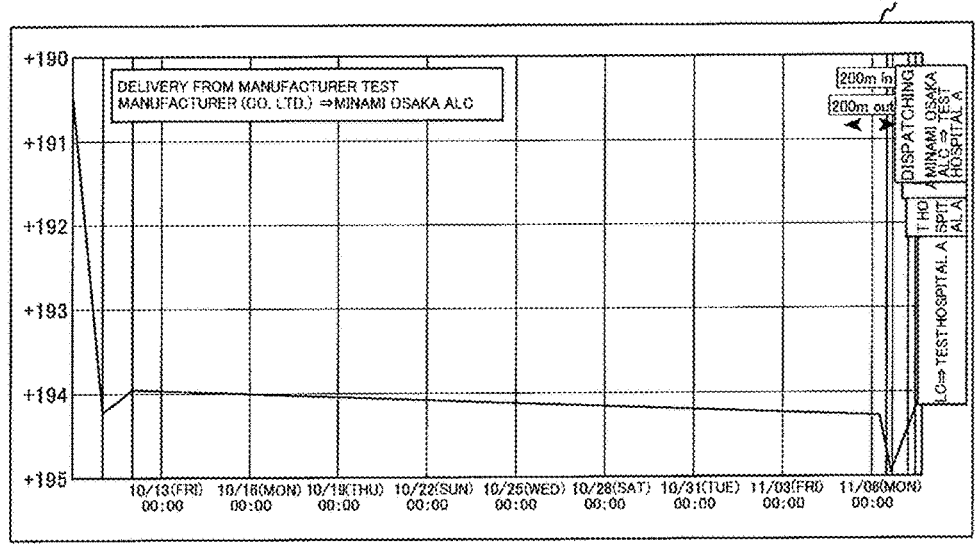
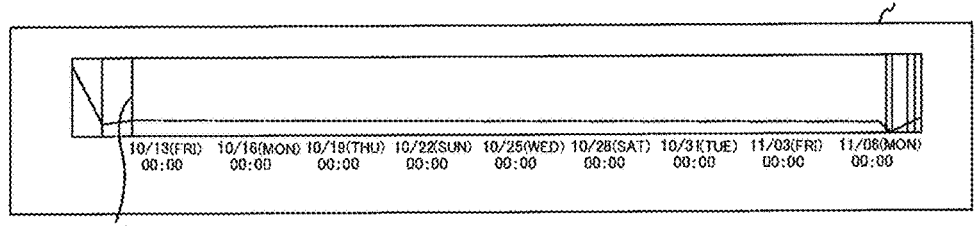

TEMPERATURE MEASUREMENT DEVICE AND QUALITY CONTROL SYSTEM

RELATED APPLICATIONS

This application is the U.S. National Phase of and claims priority to International Patent Application No. PCT/JP2020/007517, International Filing Date Feb. 25, 2020, entitled Temperature Measurement Device And Quality Control System; which claims benefit of Japanese Application No. 2019-042752 filed Mar. 8, 2019 entitled Temperature Measurement Device And Quality Control System; both of which are incorporated herein by reference in their entireties.

FIELD

The present invention relates to a quality control system suitable for checking the quality of pharmaceutical products that are accommodated in a delivery container.

BACKGROUND

Conventionally, in a delivery process of delivering articles (such as pharmaceutical products) required to be stored at a predetermined temperature to a customer (such as a medical facility), the articles are stored in a delivery container.

In a transfer process at a stage where a delivery container accommodating pharmaceutical products has arrived a medical facility, the pharmaceutical products are taken out of the delivery container to be transferred to a refrigerator managed by the medical facility.

There has been a demand to check the quality of the pharmaceutical products that are accommodated in the delivery container and the refrigerator in the delivery process and the transfer process.

Patent Literature 1 discloses an article storage system designed to continuously monitor the temperature of an article during storage when the article is stored for a predetermined period, in which the following processes are performed. (1) A courier delivers the article to one of storage parts of a locker device on the basis of a request from a purchaser, or the like. (2) The locker device includes a temperature adjusting mechanism and has a temperature sensor in each of the storage parts. When the courier loads the article in the storage part and locks the storage part, the locker device acquires temperature information from the storage part at an interval of a predetermined time and updates temperature history data to control the temperature. (3) When the courier loads the article in the storage part, the purchaser is notified of loading of the article via a communication network. The purchaser having received the notification goes to the locker device, unlocks the storage part, and unloads the article to receive the article. (4) At this time, the locker device notifies the purchaser of the temperature information.

CITATION LIST

Patent Literature

Patent Literature 1: Japanese Patent Application Laid-open No. 2017-78967

SUMMARY

Technical Problem

However, there are many processes in which pharmaceutical products are exposed to external air from the start of delivery of the pharmaceutical products until the pharmaceutical products are administered in a medical facility.

For example, there are processes such as (1) a process of transferring pharmaceutical products from a refrigerator of a medical product distributor to a delivery container immediately before the delivery, (2) a process of transferring the pharmaceutical products from the delivery container having arrived at the medical facility to a refrigerator of the medical facility, (3) a process of transferring the pharmaceutical products from the refrigerator of the medical facility to a movable container (a container conveyed to a hospital ward or an operating room), and (4) a process of taking the pharmaceutical products out of the movable container.

Further, storage of the pharmaceutical products in a predetermined temperature range is required to ensure the quality.

However, if one of the delivery container used by the courier for the delivery, the refrigerator provided in the medical facility, and the movable container used for displacement in the medical facility temporarily fails, the power supply thereof temporarily stops, or the lid of the container has been in an open state, the temperature is likely to deviate from the temperature range suitable for the pharmaceutical products.

General movable containers in medical facilities are not containers that guarantee a required temperature.

Accordingly, there has been a demand to previously check the quality of pharmaceutical products in a period including a delivery period from the start of delivery of the pharmaceutical products until arrival at a medical facility and also a period until immediately before administration of the pharmaceutical products in the medical facility, in advance to use such as administration.

One embodiment of the present invention has been achieved in view of the above circumstances, and an object of the present invention is to check the quality of pharmaceutical products until immediately before the pharmaceutical products are used.

Solution to Problem

In order to solve the above problems, the invention according to claim 1 is a temperature measurement device that includes a temperature sensor and that is accommodated in a container along with an article, the temperature measurement device comprising: a temperature deviation determination unit that determines whether a temperature of the article in the container having been detected by the temperature sensor at a predetermined measurement interval has deviated from a reference temperature range; a control unit that enables a temperature deviation flag when number of times the temperature of the article in the container has consecutively deviated from the reference temperature range exceeds a reference number as a result of determination by the temperature deviation determination unit; and a notification unit that notifies a fact that the temperature deviation flag has been enabled by the control unit.

Advantageous Effects of Invention

According to the present invention, it is possible to check the quality of pharmaceutical products until immediately before the pharmaceutical products are used.

BRIEF DESCRIPTION OF DRAWINGS

FIG. 1 is a block diagram illustrating a configuration of a quality control system according to a first embodiment of the present invention.

FIG. 2(a) is a schematic diagram illustrating a state of a packaged article, and FIG. 2(b) is a photograph showing a packaged article.

FIG. 3(a) is a block diagram illustrating a hardware configuration of an RFID reader according to the first embodiment of the present invention, and FIG. 3(b) is a block diagram illustrating a hardware configuration of the RFID tag according to the first embodiment of the present invention.

FIGS. 12(a) to 12(d) are diagrams illustrating screens displayed on a mobile terminal according to the first embodiment of the present invention.

FIG. 16(a) is a table indicating temperature deviations, and FIG. 16(b) is a graph indicating temperature deviations.

FIG. 17 is an ER diagram illustrating an association of deviation thresholds generated by the article management server according to the first embodiment of the present invention.

FIG. 19(a) is a diagram illustrating a list screen of traceability, and FIG. 19(b) is a diagram illustrating a result of search refinement.

FIG. 20 is a diagram illustrating a detail screen of traceability.

FIG. 21 is an ER diagram illustrating an association of files and masters generated by the article management server according to the first embodiment of the present invention.

FIG. 33 are diagrams respectively illustrating parts of a temperature quality certification output from a printing device according to the second embodiment of the present invention, where (a) illustrates a product specification part, (b) illustrates a barcode indicating a product code, (c) illustrates a barcode representing a lot, an expiration date, and a tag ID, and (d) is a graph representing transitions of temperature data.

FIG. 35(a) is a diagram illustrating a search condition input screen being a list screen of traceability according to the second embodiment of the present invention, and FIG. 35(b) is a diagram illustrating a result of search refinement.

FIG. 36 is a diagram illustrating a detail screen of traceability according to the second embodiment of the present invention.

FIG. 37 is a diagram illustrating a temperature history screen displayed on a user terminal, which is an example of transportation state data according to the second embodiment of the present invention.

DESCRIPTION OF EMBODIMENTS

Figure 4:
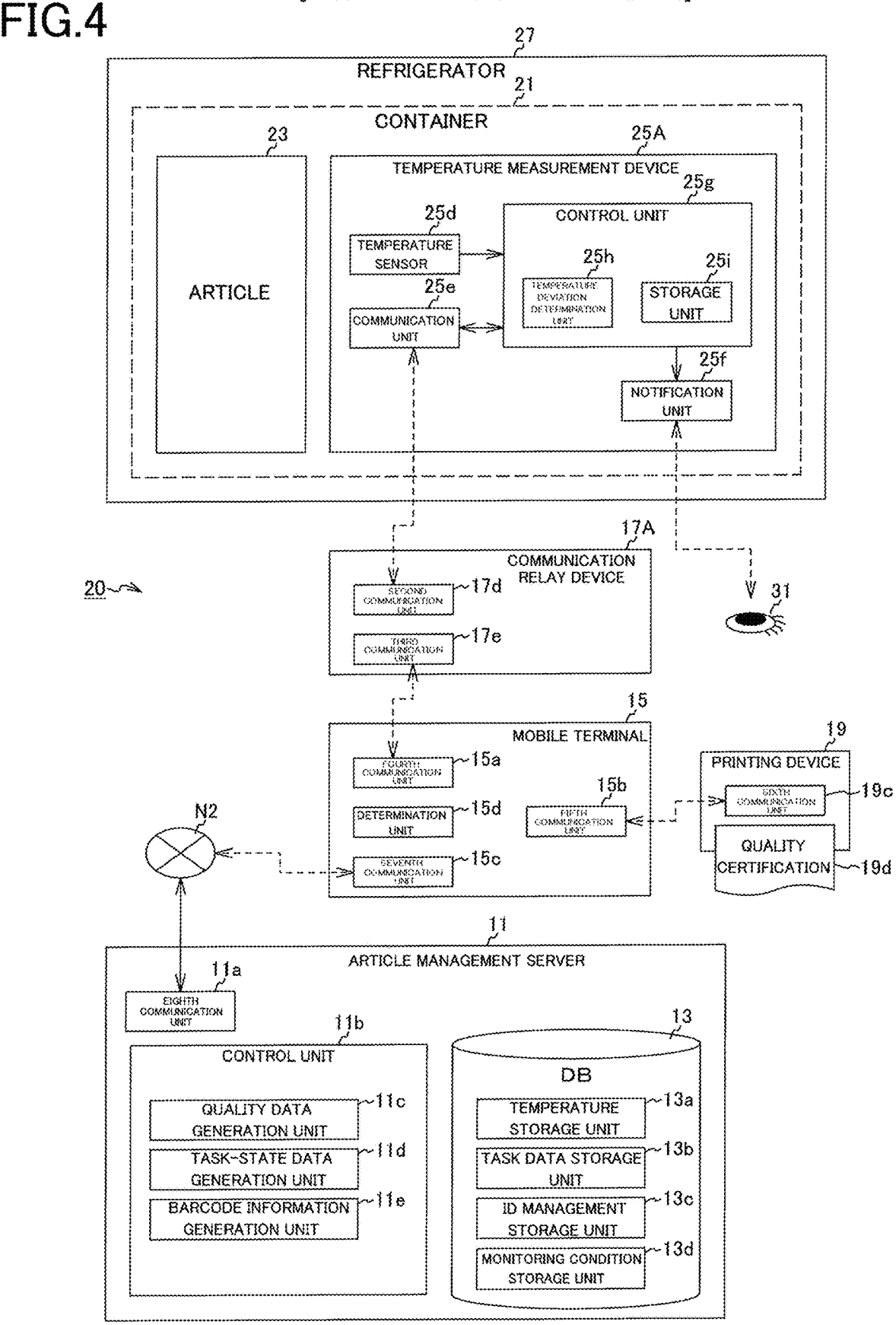
FIG. 4 is a functional block diagram of the quality control system according to the first embodiment of the present invention.

The present invention is described below in detail based on embodiments illustrated in the drawings.

The present invention has the following configuration to check the quality of pharmaceutical products until immediately before the pharmaceutical products are used.

That is, a temperature measurement device according to the present invention is a temperature measurement device including a temperature sensor and accommodated in a container along with an article, the temperature measurement device being characterized in including a temperature deviation determination unit that determines whether a temperature of the article in the container having been detected by the temperature sensor at a predetermined measurement interval has deviated from a reference temperature range, a control unit that enables a temperature deviation flag when number of times the temperature of the article in the container has consecutively deviated from the reference temperature range exceeds a reference number as a result of determination by the temperature deviation determination unit, and a notification unit that notifies a fact that the temperature deviation flag has been enabled by the control unit.

With the configuration described above, it is possible to check the quality of pharmaceutical products until immediately before the pharmaceutical products are used.

Characteristics of the present invention described above are explained in detail with reference to the drawings mentioned below. Note that, unless otherwise specified, constituent elements, types, combinations, shapes, and relative arrangements thereof described in the following embodiments are not intended to limit the scope of the present invention solely thereto and are only explanatory examples.

Characteristics of the present invention described above are explained below in detail with reference to the drawings.

First Embodiment

<Quality Control System>

FIG. 1 is a block diagram illustrating a configuration of a quality control system according to a first embodiment of the present invention.

In the following descriptions, like constituent elements are denoted by like reference signs and explained.

A quality control system 1 includes a client terminal (a medical facility storehouse) 3, a client terminal (a hospital ward) 5, communication networks N1 and N2, an article management server (a deliverer) 11, a database DB13, a mobile terminal 15, an RFID reader 17, a printing device 19, and an RFID tag 25.

In the present embodiment, each of the client terminal 3, the client terminal 5, the mobile terminal 15, the RFID reader 17, the printing device 19, and the RFID tag 25 is configured by a plurality of units. However, each of these components may be configured by one unit. Further, while the communication network is divided into N1 and N2, these communication networks N1 and N2 may be configured by a same communication network.

A front end server 9 has a function of receiving data from the client terminals 3 and 5 via the communication network N1 to manage direct access service to the client terminals 3 and 5 and change of a display format.

The client terminal 3 is a terminal operable by staffs in the medical facility storehouse. The client terminal 5 is a terminal operable by health professionals such as doctors and nurses in the medical facility.

The article management server 11 receives data of the mobile terminals 15 via the communication network N2 to manage the state of each of the mobile terminals 15.

The article management server 11 includes therein a ROM (Read Only Memory), a RAM (Random Access Memory), a CPU (Central Processing Unit), and an HDD (Hard Disk Drive), reads an operating system OS from the HDD and loads the OS on the RAM to activate the OS, and reads programs (programs indicated by various flowcharts described later) from the HDD to perform various processes under control of the OS.

<Packaging of Article>

FIG. 2(a) is a schematic diagram illustrating a state of a packaged article, and FIG. 2(b) is a photograph showing a packaged article.

As illustrated in FIG. 2(a), an article 23 and the RFID tag 25 are accommodated in a bag 21 and a tag having a barcode printed thereon is provided on a zip fastener part for opening and closing the bag 21. The RFID tag 25 is an example of a temperature measurement device which will be described later.

As in the photograph shown in FIG. 2(b), an article and an RFID tag are accommodated in a bag and a zip fastener part for opening and closing the bag is provided thereon.

<RFID Reader>

FIG. 3(a) is a block diagram illustrating a hardware configuration of the RFID reader according to the first embodiment of the present invention.

As illustrated in FIG. 3(a), the RFID reader 17 includes a CPU 17a, a memory 17b, a battery 17c, a communication unit 17d, a communication unit 17e, an antenna ANT1, and an antenna ANT2.

The CPU 17a has a ROM and a RAM therein and reads programs (programs indicated by various flowcharts described later) from the ROM to perform various processes using the RAM as a work area.

The memory 17b is a non-volatile memory medium and stores therein the reader ID of the RFID reader 17, data, and the like. For example, an NVRAM (Non Volatile RAM) is used as the non-volatile memory medium, and data required to be memorized even in a case where power of the battery 17c is off is stored therein.

The battery 17c discharges DC power and supplies the DC power to an internal circuit of the RFID reader 17.

The communication unit 17d is a resonant circuit for communicating with the RFID tag 25 via the antenna ANT1 using a frequency in the UHF band, and inputs and outputs a communication signal from/to the CPU 17a.

The communication unit 17e is a resonant circuit for performing Bluetooth (registered trademark) communication with the mobile terminal 15 via the antenna ANT2 using a frequency in a 2.4-GHz band, and inputs and outputs a communication signal from/to the CPU 17a.

<RFID Tag>

FIG. 3(b) is a block diagram illustrating a hardware configuration of the RFID tag according to the first embodiment of the present invention.

As illustrated in FIG. 3(b), the RFID tag 25 includes a CPU 25a, a memory 25b, a battery 25c, a temperature sensor 25d, a communication unit 25e, an antenna ANT3, and a light-emitting diode LED1.

The CPU 25a has a ROM and a RAM therein and reads programs (programs indicated by various flowcharts described later) from the ROM to perform various processes using the RAM as a work area.

The memory 25b is a non-volatile memory medium and stores therein the tag ID, a threshold, a measurement interval, a temperature deviation flag F, date/time data, and the like. For example, an NVRAM (Non Volatile RAM) is used as the non-volatile memory medium, and data required to be memorized even in a case where power of the battery 25c is off is stored therein.

The battery 25c discharges DC power and supplies the DC power to an internal circuit of the RFID tag 25.

The temperature sensor 25d detects an ambient temperature and outputs temperature data to the CPU 25a.

The communication unit 25e is a resonant circuit for communicating with the RFID reader 17 via the antenna ANT1 using a frequency in the UHF band, and inputs and outputs a communication signal from/to the CPU 25a.

The light-emitting diode LED1 is turned on when the CPU 25a brings the temperature deviation flag F to a high-level state and is turned off when the CPU 25a brings the temperature deviation flag F to a low-level state.

<Functional Block>

FIG. 4 is a functional block diagram of the quality control system according to the first embodiment of the present invention.

A temperature measurement device 25A is a temperature measurement device 25A that includes the temperature sensor 25d and that is accommodated in the container 21 along with the article 23, and is characterized in including a temperature deviation determination unit 25h that determines whether a temperature of the article 23 in the container 21 having been detected by the temperature sensor 25d at a predetermined measurement interval has deviated from a reference temperature range, a control unit 25g that enables the temperature deviation flag when the number of times the temperature of the article 23 in the container 21 has consecutively deviated from the reference temperature range exceeds a reference number as a result of determination by the temperature deviation determination unit 25h, and a notification unit 25f that notifies the fact that the temperature deviation flag has been enabled by the control unit 25g.

The temperature measurement device 25A includes a storage unit 25i, and the control unit 25g is characterized in storing the temperature deviation flag and a date and time when the temperature has deviated, in the storage unit 25i.

The control unit 25g is characterized in storing the temperature of the article in the container 21 detected by the temperature sensor 25d at a predetermined interval, and/or the temperature deviation flag in the storage unit 25i.

The control unit 25g is characterized in storing a temperature upper limit, a temperature lower limit, a measurement interval, and a reference number as monitoring conditions in the storage unit 25i, the temperature deviation determination unit 25h is characterized in determining, based on the temperature upper limit, the temperature lower limit, and the measurement interval acquired from the storage unit 25i, whether the temperature of the article 23 in the container 21 having been detected by the temperature sensor 25d at a predetermined measurement interval has deviated from a reference temperature range from the temperature upper limit to the temperature lower limit, and the control unit 25g is characterized in enabling the temperature deviation flag when the number of times the temperature of the article 23 in the container 21 has consecutively deviated from the reference temperature range exceeds the reference number as a result of determination by the temperature deviation determination unit 25h on the basis of the reference number acquired from the storage unit 25i.

The notification unit 25f is characterized in being a light-emitting element that is turned on when the temperature deviation flag is enabled.

The temperature measurement device 25A is characterized in including an RFID tag.

A quality control system 20 is characterized in including the temperature measurement device 25A, and a refrigerator 27 that keeps the temperature of the container 21 accommodating both the temperature measurement device 25A and the article 23 in a predetermined range when the container is stored inside the refrigerator. The refrigerator 27 is for keeping the article 23 cool and may be a delivery container having a function to keep articles cool.

The quality control system 20 includes the temperature measurement device 25A and the mobile terminal 15 that communicates with the temperature measurement device 25A, and is characterized in that the temperature measurement device 25A includes the first communication unit 25e that transmits the temperature deviation flag to the mobile terminal 15 in response to a transmission request from the mobile terminal 15, and the mobile terminal 15 includes a fourth communication unit 15a that communicates with the temperature measurement device 25A, and a determination unit 15d that determines the article 23 is in an abnormal state when having received the enabled temperature deviation flag from the temperature measurement device 25A.

The quality control system 20 is characterized in including a communication relay device 17A that includes a second communication unit 17d communicating with the temperature measurement device 25A and a third communication unit 17e communicating with the mobile terminal 15, and that relays communication between the temperature measurement device 25A and the mobile terminal 15 via the second communication unit 17d and the third communication unit 17e. The mobile terminal 15 and the temperature measurement device 25A may be configured to directly communicate with each other without via the communication relay device 17A.

The quality control system 20 includes an article management server 11 that communicates with the mobile terminal 15, and is characterized in that the temperature measurement device 25A includes the storage unit 25i that stores therein the temperature of the article 23 in the container 21, the date and time, and the temperature deviation flag, and the first communication unit 25e that transmits the temperature of the article 23 in the container 21, the date and time, and the temperature deviation flag, read from the storage unit 25i to the mobile terminal 15 in response to a transmission request from the mobile terminal 15, and the article management server 11 includes a temperature storage unit 13a that stores therein the temperature of the article 23 in the container 21, the date and time, and the temperature deviation flag received from the mobile terminal 15, and a quality data generation unit that generates quality data related to the article 23 in the container 21 on the basis of the temperature of the article 23, the date and time, and the temperature deviation flag, acquired from the temperature storage unit 13a.

The quality control system 20 is characterized in including the printing device 19 that includes a sixth communication unit 19c communicating with the mobile terminal 15 and that prints quality data received from the mobile terminal 15 via the sixth communication unit as a quality certification.

The mobile terminal 15 is characterized in including a seventh communication unit 15c that transmits a task status indicating a task state generated according to an operation to the mobile terminal 15, the temperature of the article 23 in the container 21, the date and time, and the temperature deviation flag to the article management server 11.

The article management server 11 is characterized in including a task data storage unit 13b that stores therein the task status received from the mobile terminal 15, a temperature storage unit 13a that stores therein the temperature of the article 23, the date and time, and the temperature deviation flag, and a task-state data generation unit 11d that generates task state data indicating the task status related to the article 23 on the basis of the task status acquired from the task data storage unit 13b, and the temperature of the article 23, the date and time, and the temperature deviation flag acquired from the temperature storage unit 13a.

The task state data indicates aggregated data of task statuses input from the mobile terminal 15 at the time of storage into hospital wards, administration to patients, and the like. The task status indicates a work process such as the start of monitoring, storage into hospital wards, or administration.

The article management server 11 is characterized in including an ID management storage unit 13c that stores therein the ID of the temperature measurement device 25A, the number of the container 21, and the product code of the article 23, that are received from the mobile terminal 15, to be associated with each other.

The article management server 11 includes a monitoring condition storage unit 13d that stores therein the temperature upper limit, the temperature lower limit, the measurement interval, and the reference number as monitoring conditions of the temperature measurement device 25A, and an eighth communication unit 11a that transmits the monitoring conditions acquired from the monitoring condition storage unit 13d to the mobile terminal 15, the mobile terminal 15 is characterized in including the fourth communication unit 15a that transmits the monitoring conditions received from the article management server 11 to the temperature measurement device 25A, and the control unit 25g of the temperature measurement device 25A is characterized in storing the monitoring conditions received from the mobile terminal 15 in the storage unit 25i and executes control to monitor the temperature of the article 23 in the container 21 on the basis of the monitoring conditions acquired from the storage unit 25i.

The article management server 11 is characterized in including a barcode information generation unit 11e that generates a container number for identifying the container 21 accommodating both the article 23 and the temperature measurement device 25A as a barcode.

<Sequence Diagram of Task Procedure>

Figure 5:
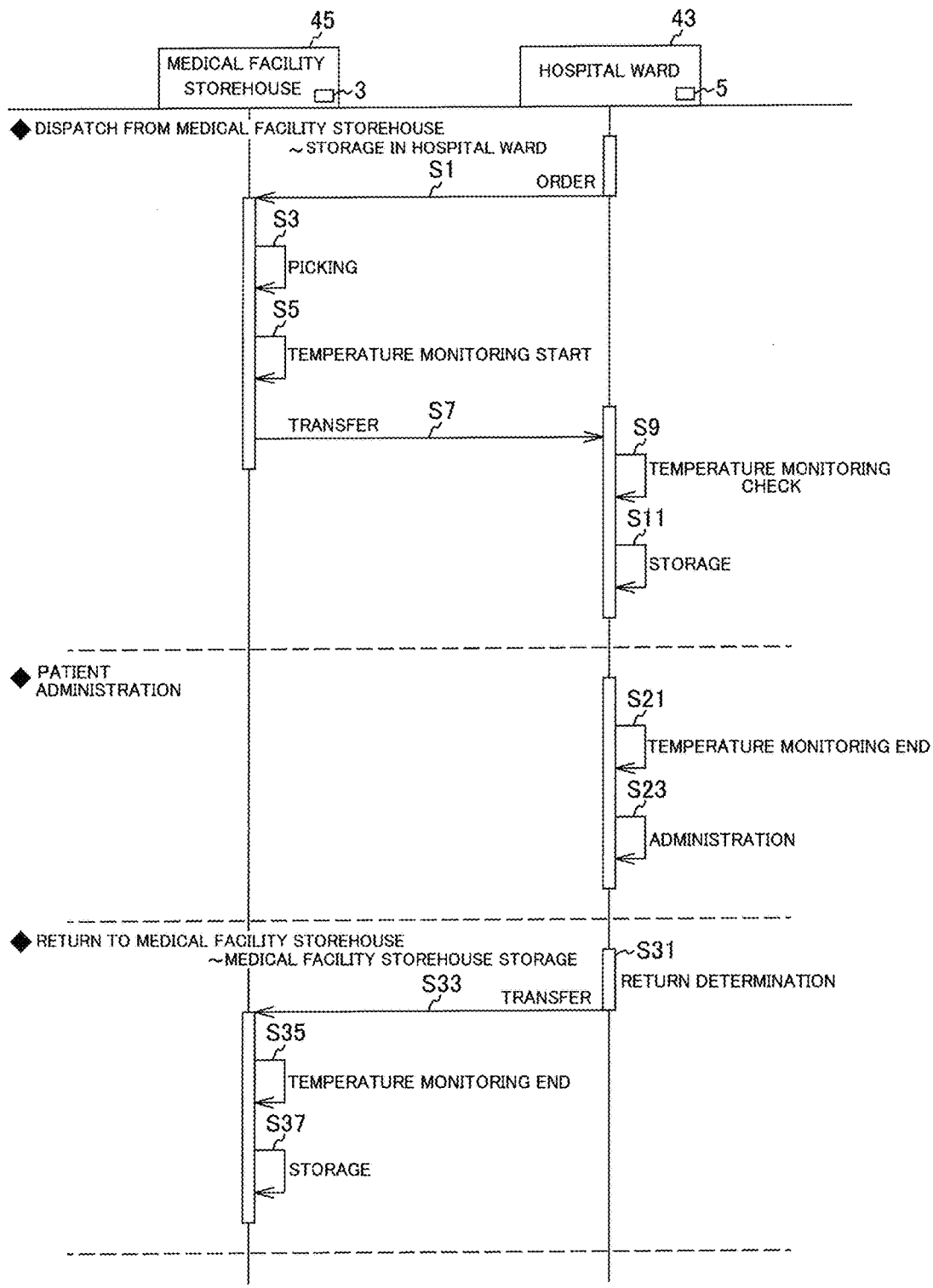
FIG. 5 is a sequence diagram illustrating an overall task procedure of the quality control system according to the first embodiment of the present invention.

FIG. 5 is a sequence diagram illustrating an overall task procedure of the quality control system according to the first embodiment of the present invention.

Since no device for acquiring the temperature is attached to medical products that are kept cold and delivered from a pharmaceutical distributor to a medical facility storehouse, the temperature monitoring cannot be performed. Accordingly, the first embodiment is characterized in that temperature deviation monitoring for medical products kept cold is started in a medical facility storehouse.

<From Dispatch to Storage>

A task procedure from when articles are dispatched from a storehouse of a hospital facility until when the articles are stored in a refrigerator of a hospital ward is first explained.

At Step S1, the client terminal 5 provided in a hospital ward 43 performs registration on an ordering screen as an ordering task. At this time, the client terminal 3 provided in a medical facility storehouse 45 receives the order information.

At Step S3, in the medical facility storehouse 45, a slip is referred to and a required number of articles are picked out of a plurality of stocked articles, and the articles are accommodated in a container 21 (a bag) and are further housed in a delivery container 53, as a dispatching operation.

Next, at Step S5, the mobile terminal 15 is operated to activate the temperature measurement device 25A and start temperature monitoring.

The delivery container 53 is mounted on a vehicle.

At Step S7, delivery of the delivery container 53 from the medical facility storehouse 45 to the hospital ward 43 is started.

At Step S9, a health processional monitors and checks the temperature of the articles accommodated in the delivery container 53 using the mobile terminal 15 in the hospital ward 43.

At Step S11, the articles are taken out of the delivery container 53 and are stored in the refrigerator 27 in the hospital ward 43.

<Patient Administration>

A task procedure at a time of administering pharmaceutical products as articles to patients is explained next.

At Step S21, the temperature monitoring is ended.

At Step S23, the pharmaceutical products (the articles) are taken out of the refrigerator 27 and the pharmaceutical products are administered to patients.

<Return of Pharmaceutical Products>

A procedure of returning pharmaceutical products is explained next.

At Step S31, when unadministered pharmaceutical products remain at a time when health professionals have administered the pharmaceutical products to patients or when health professionals have not administered the pharmaceutical products to patients, return of the pharmaceutical products is determined.

At Step S33, delivery of the delivery container 53 from the hospital ward 43 to the medical facility storehouse 45 is started.

At Step S35, monitoring of the temperature of the articles accommodated in the delivery container 53 is ended.

At Step S37, the bagged pharmaceutical products are taken out of the delivery container 53 and are stored in the refrigerator 27.

<Sequence Diagram Illustrating Dispatching Task>

Figure 6:
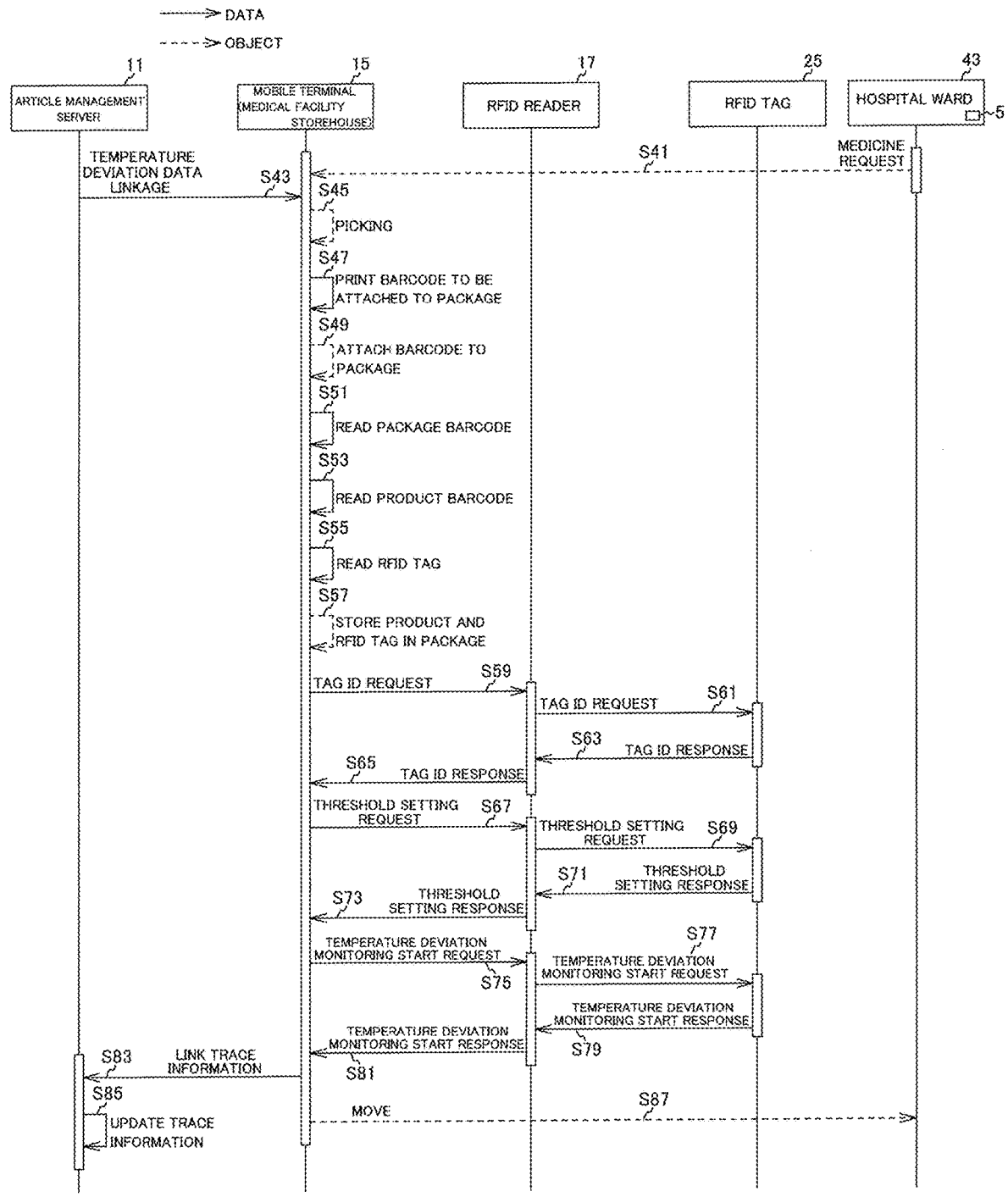
FIG. 6 is a sequence diagram illustrating a task of dispatching in a medical facility (a storehouse), to which the quality control system according to the first embodiment of the present invention is applied.

FIG. 6 is a sequence diagram illustrating a task of dispatching in a medical facility (a storehouse), to which the quality control system according to the first embodiment of the present invention is applied.

At Step S41, dispatching of pharmaceutical products is requested from the hospital ward 43 to the client terminal 3 provided in the medical facility.

At Step S43, RFID-tag group M information (for setting threshold information of an RFID tag), package management F information (for printing a package barcode), and temperature deviation data are linked.

At Step S45, a slip is referred to, a required number of articles are picked out of a plurality of stocked articles, and the articles are accommodated in a delivery container 53 as a dispatching operation.

At Step S47, a barcode to be attached to the package is printed on a sheet.

At Step S49, the barcode is attached to the package.

At Step S51, barcode information is read from the barcode attached to the package using the mobile terminal 15.

At Step S53, barcode information is read from the product barcode attached to the package using the mobile terminal 15.

At Step S55, the RFID tag is read.

At Step S57, the product and the RFID tag are stored in the package.

At Step S59, the mobile terminal 15 transmits a tag ID request to the RFID reader 17.

At Step S61, the RFID reader 17 transmits a tag ID request to the RFID tag 25.

At Step S63, the RFID tag 25 reads the tag ID from the memory and responds to the RFID reader 17 by transmitting thereto the tag ID.

At Step S65, the RFID reader 17 responds to the mobile terminal 15 by transmitting thereto the tag ID received from the RFID tag 25.

At Step S67, the mobile terminal 15 transmits a threshold setting request to the RFID reader 17.

At Step S69, the RFID reader 17 transmits a threshold setting request to the RFID tag 25.

At Step S71, the RFID tag 25 sets thresholds in the memory and responds to the RFID reader 17 by transmitting thereto the effect that the thresholds have been set.

At Step S73, the RFID reader 17 responds to the mobile terminal 15 by transmitting thereto the effect that the thresholds have been set, which is received from the RFID tag 25.

At Step S75, the mobile terminal 15 transmits a temperature deviation monitoring start request to the RFID reader 17.

At Step S77, the RFID reader 17 transmits a temperature deviation monitoring start request to the RFID tag 25.

At Step S79, the RFID tag 25 starts temperature deviation monitoring in response to the temperature deviation monitoring start request and responds to the RFID reader 17 by transmitting thereto the effect that the temperature deviation monitoring has been started.

At Step S81, the RFID reader 17 responds to the mobile terminal 15 by transmitting thereto the effect that the temperature deviation monitoring has been started, which is received from the RFID tag 25.

At Step S83, the mobile terminal 15 transmits the task status, the product code, the package barcode, and the tag ID of the RFID tag to the article management server 11 to link trace information.

At Step S85, the article management server 11 updates the task status, the product code, the package barcode, and the tag ID of the RFID tag received from the mobile terminal 15 as the trace information.

At Step S87, a staff in the medical facility carrying the mobile terminal 15 moves the delivery container 53 accommodating the pharmaceutical products to the hospital ward 43.

<Sequence Diagram Illustrating Storing Task>

Figure 7:
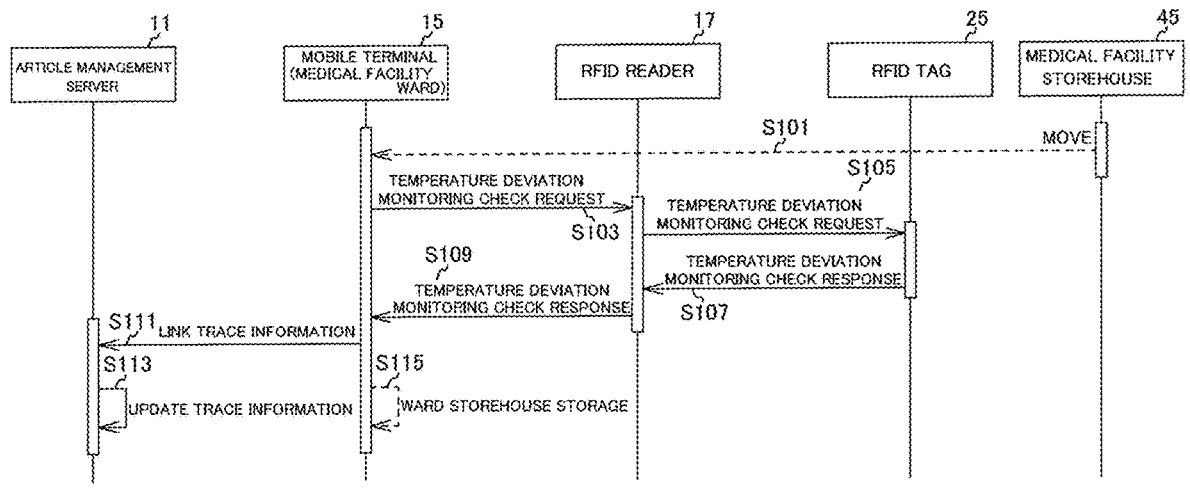
FIG. 7 is a sequence diagram illustrating a storage task in a medical facility (a hospital ward), to which the quality control system according to the first embodiment of the present invention is applied.

FIG. 7 is a sequence diagram illustrating a storage task in a medical facility (a hospital ward), to which the quality control system according to the first embodiment of the present invention is applied.

At Step S101, the delivery container 53 accommodating the pharmaceutical products is moved from the medical facility storehouse 45 to a staff in the medical facility carrying the mobile terminal 15.

At Step S103, the mobile terminal 15 transmits a temperature deviation monitoring check request to the RFID reader 17.

At Step S105, the RFID reader 17 transmits a temperature deviation monitoring check request to the RFID tag 25.

At Step S107, the RFID tag 25 checks temperature deviation monitoring in response to the temperature deviation monitoring check request and responds to the RFID reader 17 by transmitting thereto a temperature deviation monitoring check.

At Step S109, the RFID reader 17 responds to the mobile terminal 15 by transmitting thereto the temperature deviation monitoring check received from the RFID tag 25.

At Step S111, the mobile terminal 15 transmits the task status, the temperature, the temperature deviation flag, and the date and time to the article management server 11 to link the trace information.

At Step S111, the mobile terminal 15 transmits the task status, the temperature, the temperature deviation flag, and the date and time to the article management server 11 to link the trace information.

At Step S113, the article management server 11 updates the task status, the temperature, the temperature deviation flag, and the date and time received from the mobile terminal 15 as the trace information.

At Step S115, the staff in the medical facility carrying the mobile terminal 15 stores the delivery container 53 accommodating the pharmaceutical products in the refrigerator 27 of the ward storehouse. The container is a delivery container which is portable that can be moved in and out of the refrigerator by the operator.

<Sequence Diagram Illustrating Dispatching Task>

Figure 8:
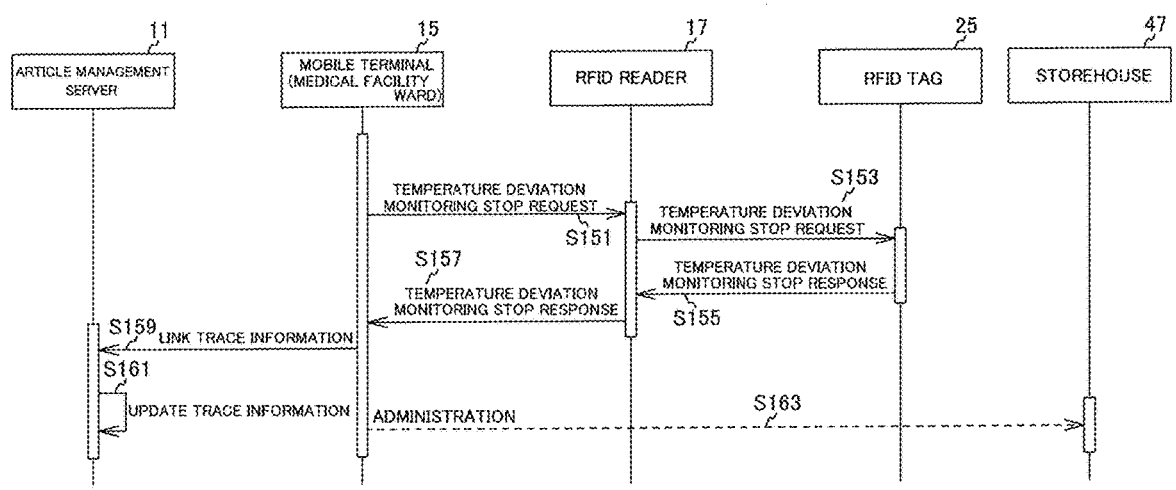
FIG. 8 is a sequence diagram illustrating a task of dispatching from a medical facility (a hospital ward), to which the quality control system according to the first embodiment of the present invention is applied.

FIG. 8 is a sequence diagram illustrating a task of dispatching from a medical facility (a hospital ward), to which the quality control system according to the first embodiment of the present invention is applied.

At Step S151, the mobile terminal 15 transmits a temperature deviation monitoring stop request to the RFID reader 17.

At Step S153, the RFID reader 17 transmits a temperature deviation monitoring stop request to the RFID tag 25.

At Step S155, the RFID tag 25 stops the temperature deviation monitoring in response to the temperature deviation monitoring stop request and responds to the RFID reader 17 by transmitting thereto the effect that the temperature deviation monitoring has been stopped.

At Step S157, the RFID reader 17 responds to the mobile terminal 15 by transmitting thereto the effect that the temperature deviation monitoring has been stopped, which is received from the RFID tag 25.

At Step S159, the mobile terminal 15 transmits the task status, the temperature, the temperature deviation flag, and the date and time to the article management server 11 to link the trace information.

At Step S161, the article management server 11 updates the task status, the temperature, the temperature deviation flag, and the date and time received from the mobile terminal 15 as the trace information.

At Step S163, health professionals in the medical facility ward take medicines from the delivery container 53 and administer the medicines to patients.

<Sequence Diagram Illustrating Return Task>

Figure 9:
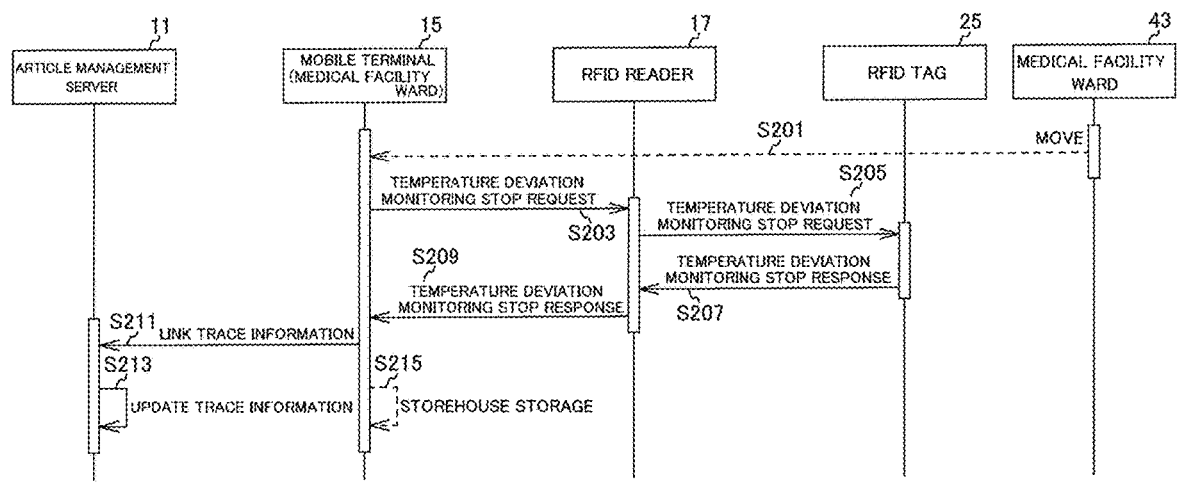
FIG. 9 is a sequence diagram illustrating a task of return from a medical facility (a hospital ward) to a medical facility (a storehouse), to which the quality control system according to the first embodiment of the present invention is applied.

FIG. 9 is a sequence diagram illustrating a task of return from a medical facility (a hospital ward) to a medical facility (a storehouse), to which the quality control system according to the first embodiment of the present invention is applied.

At Step S201, the delivery container 53 accommodating medicines is moved from the medical facility ward 43 to a staff in the medical facility storehouse carrying the mobile terminal 15.

At Step S203, the mobile terminal 15 transmits a temperature deviation monitoring stop request to the RFID reader 17.

At Step S205, the RFID reader 17 transmits a temperature deviation monitoring stop request to the RFID tag 25.

At Step S207, the RFID tag 25 stops the temperature deviation monitoring in response to the temperature deviation monitoring stop request and responds to the RFID reader 17 by transmitting thereto the effect that the temperature deviation monitoring has been stopped.

At Step S209, the RFID reader 17 responds to the mobile terminal 15 by transmitting thereto the effect that the temperature deviation monitoring has been stopped, which is received from the RFID tag 25.

At S211, the mobile terminal 15 transmits the task status, the temperature, the temperature deviation flag, and the date and time to the article management server 11 to link the trace information.

At Step S213, the article management server 11 updates the task status, the temperature, the temperature deviation flag, and the date and time received from the mobile terminal 15 as the trace information.

At Step S215, the staff in the medical facility storehouse carrying the mobile terminal 15 stores the delivery container 53 accommodating the medicines in the refrigerator 27 of the medical facility storehouse.

<System Configuration Diagram>

Figure 10:
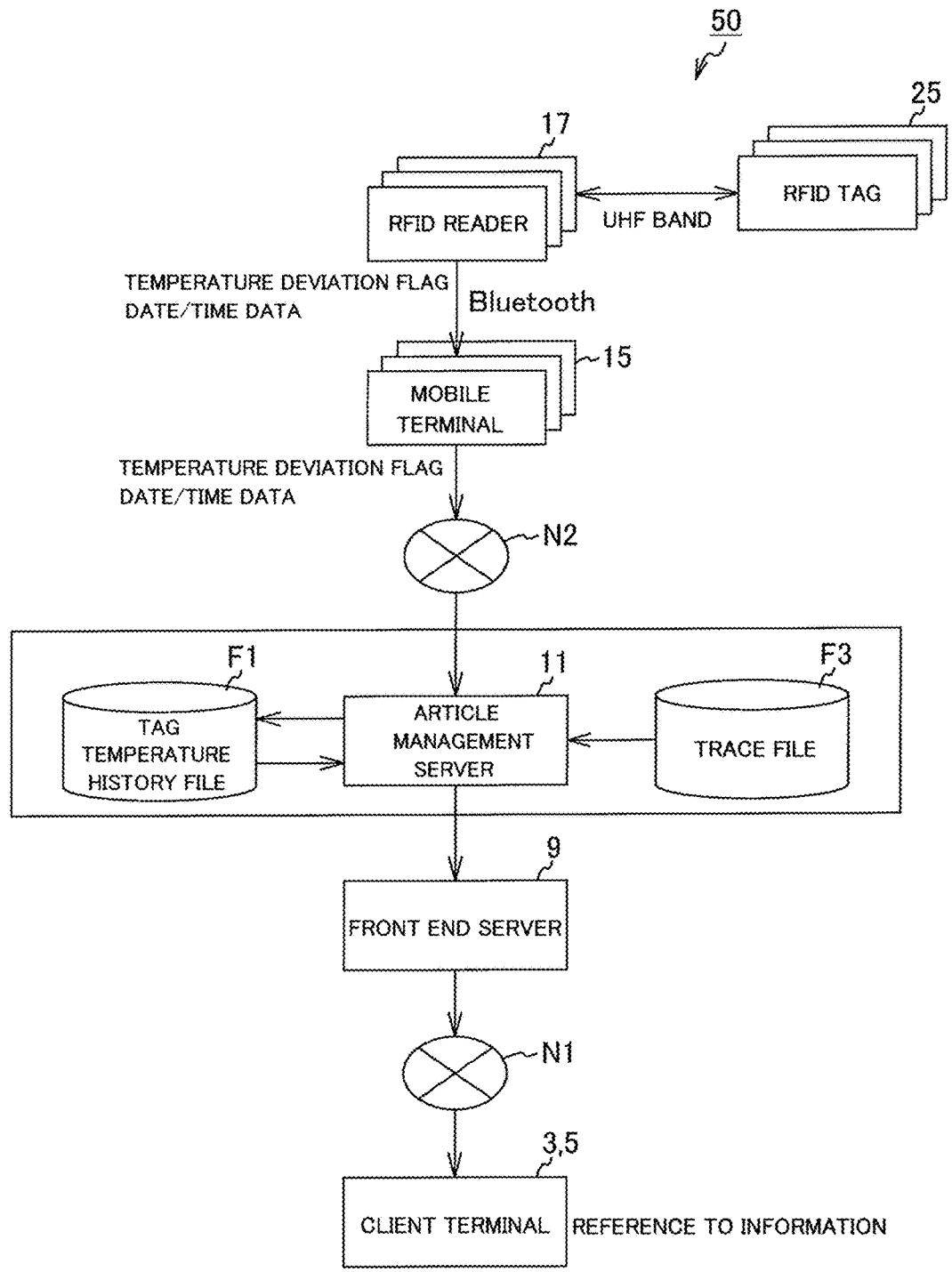
FIG. 10 is a system configuration diagram illustrating acquisition of a temperature deviation determination result on an article by the quality control system according to the first embodiment of the present invention.

FIG. 10 is a system configuration diagram illustrating acquisition of a temperature deviation determination result on an article by the quality control system according to the first embodiment of the present invention.

A quality control system 50 includes the RFID tag 25, the RFID reader 17, the mobile terminal 15, the communication network N2, the article management server 11, a tag temperature history file F1, a trace file F3, the front end server 9, the communication network N1, and the client terminals 3 and 5.

The tag temperature history file F1 is stored in the database DB13 and has stored therein the bag number and the temperature deviation flag F acquired from the RFID tag 25 via the RFID reader 17, the mobile terminal 15, the communication network N2, and the article management server 11 to be associated with the tag ID and date/time data.

The trace file F3 is stored in the database DB13 and has stored therein the date/time data, the bag number, the product code, and the terminal ID to be associated with the task ID and the tag ID.

Further, when update of the task ID being status information indicating task contents occurs, the article management server 11 generates a detail screen G15 on traceability by associating the temperature deviation data acquired from the tag temperature history file F1 with the task ID and the date/time data acquired from the trace file F3, and transmits the detail screen G15 to the front end server 9 to be transmitted to the client terminal 3 or 5 via the communication network N1.

<ER Diagram>

Figure 11:
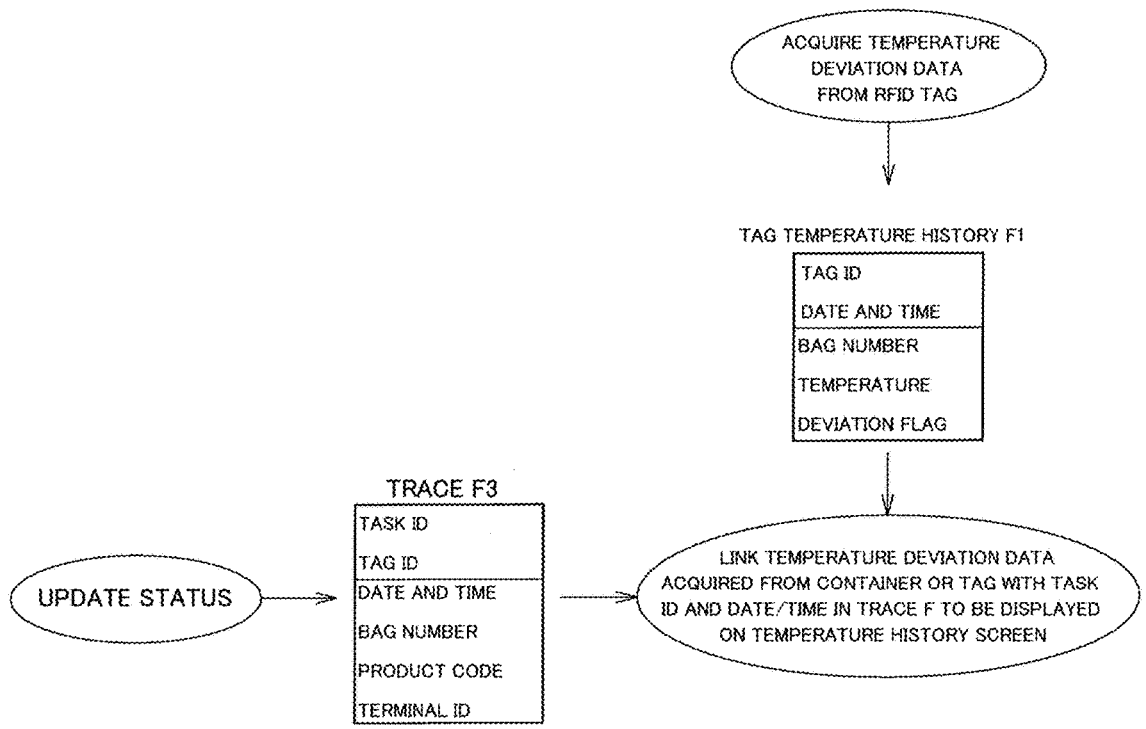
FIG. 11 is an ER diagram illustrating an association at the time of acquisition of a temperature and a temperature deviation flag generated by an article management server according to the first embodiment of the present invention.

FIG. 11 is an ER diagram illustrating an association at the time of acquisition of a temperature and a temperature deviation flag generated by the article management server 11 according to the first embodiment of the present invention.

The article management server 11 acquires the temperature deviation flag F, the temperature data, the bag number, the tag ID, and the date/time data from the RFID tag 25 via the RFID reader 17 and the mobile terminal 15 to generate the tag temperature history file F1, and stores the tag temperature history file F1 in the temperature storage unit 13a of the database DB13.

When the task ID that is received from the mobile terminal 15 and that is status information indicating the task contents is updated, the article management server 11 updates the date/time data, the bag number, the product code, and the terminal ID stored in the trace file F3 to be associated with the tag ID.

Further, when update of the task ID that is the status information indicating the task contents occurs, the article management server 11 associates the temperature deviation data acquired from the tag temperature history file F1 with the task ID and the date/time data acquired from the trace file F3 to generate a temperature history screen G23.

<Display Screen of Mobile Terminal>

FIG. 12 are diagrams illustrating screens displayed on the mobile terminal according to the first embodiment of the present invention.

FIG. 12(a) illustrates a menu screen G1 and the menu includes three options "temperature monitoring start", "temperature determination", and "master setting".

FIG. 12(b) illustrates a temperature monitoring start screen G3, which is a screen on which an operation for associating a product being an article with an RFID tag is performed when the article is dispatched from a medical facility storehouse, and information on the product and the RFID tag is stored in a DB.

FIG. 12(c) illustrates a temperature determination screen G5, on which a task to be performed is selected and a temperature determination is performed.

FIG. 12(d) illustrates a master setting screen G7, which is a screen for performing settings of an RFID tag. The screen receives settings on an upper temperature threshold, a lower temperature threshold, a measurement interval, and the like for each RFID tag. These settings are necessary for performing temperature deviation management.

<Setting of Monitoring Conditions>

Figure 13:
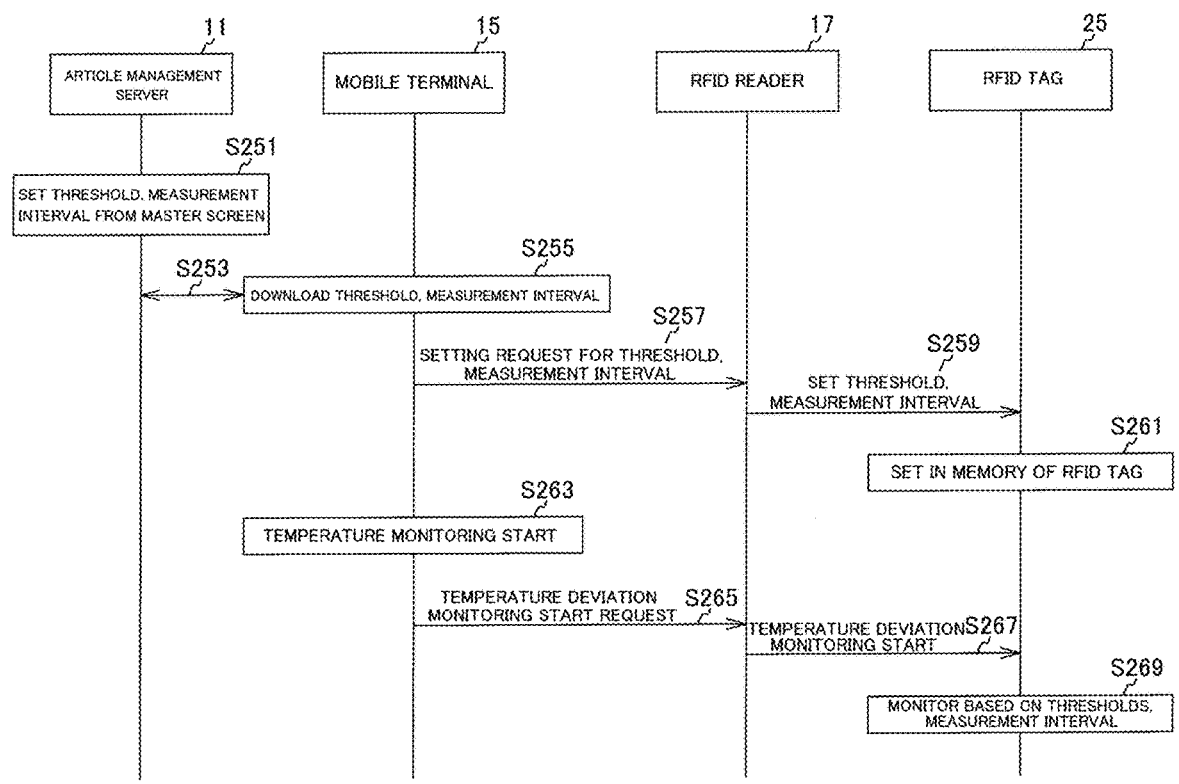
FIG. 13 is a sequence diagram at a time when monitoring conditions for a temperature deviation determination are set in the RFID tag according to the first embodiment of the present invention and temperature deviation monitoring is started.

FIG. 13 is a sequence diagram at a time when monitoring conditions for a temperature deviation determination are set in the RFID tag according to the first embodiment of the present invention and the temperature deviation monitoring is started.

At Step S251, the article management server 11 determines the thresholds and the measurement interval from a master screen (not illustrated).

At Step S253, the article management server 11 adds the tag ID of an RFID tag being a setting target to the determined thresholds and measurement interval, and waits a download request from the mobile terminal 15.

At Step S255, the mobile terminal 15 transmits a download request to the article management server 11 to download the thresholds, the measurement interval, and the tag ID of the RFID tag from the article management server 11.

At Step S257, the mobile terminal 15 transmits a setting request for the thresholds, the measurement interval, and the tag ID of the RFID tag to the RFID reader 17.

At Step S259, the RFID reader 17 transmits the thresholds and the measurement interval to the RFID tag 25 while designating the tag ID of the RFID tag.

At Step S261, the RFID tag 25 sets the thresholds and the measurement interval received from the RFID reader 17 in the memory.

At Step S263, the mobile terminal 15 starts temperature monitoring.

At Step S265, the mobile terminal 15 adds the tag ID of the RFID tag to a temperature deviation monitoring start request to be transmitted to the RFID reader 17.

At Step S267, the RFID reader 17 transmits a temperature deviation monitoring start instruction to the RFID tag 25 while designating the tag ID of the RFID tag.

At Step S269, the RFID tag 25 starts monitoring processing while referring to the thresholds and the measurement interval.

<Temperature Deviation Determination>

Figure 14:
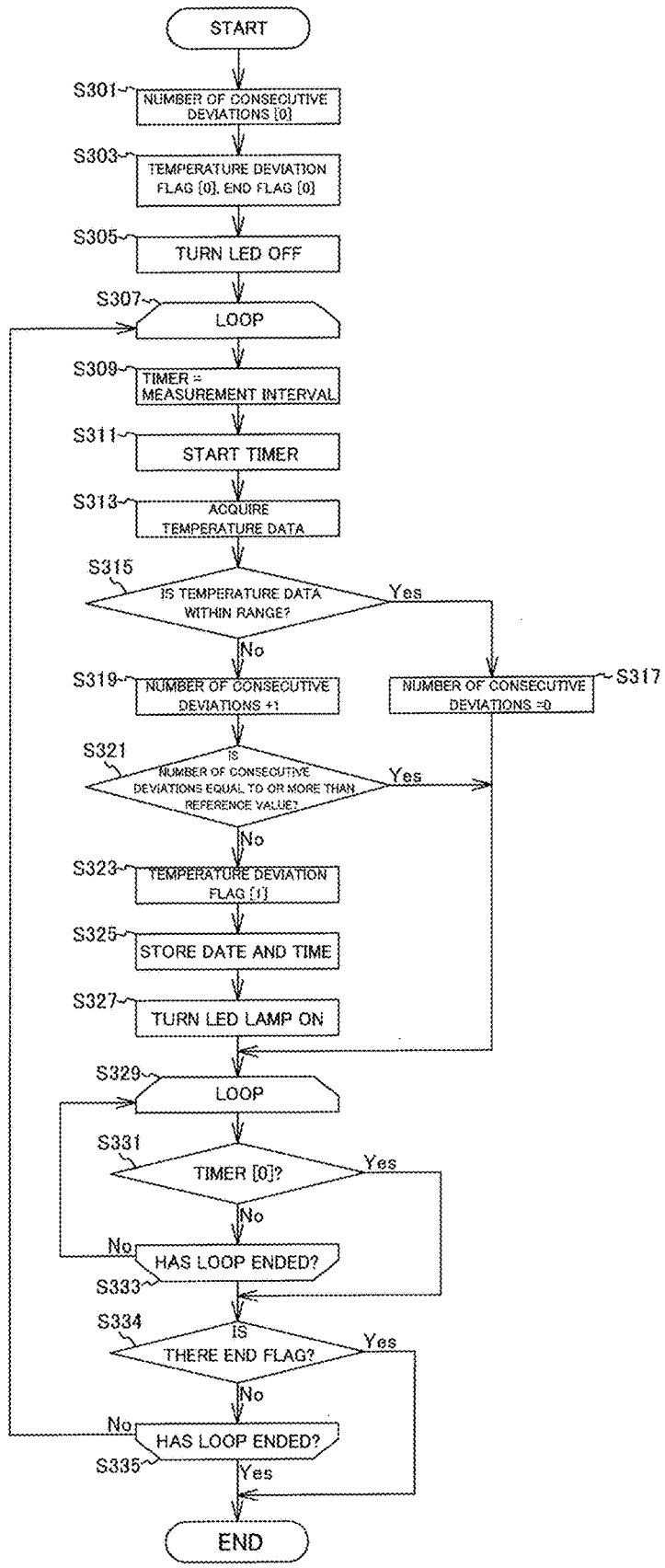
FIG. 14 is a flowchart illustrating a temperature deviation determination performed by the RFID tag according to the first embodiment of the present invention.

FIG. 14 is a flowchart illustrating a temperature deviation determination performed by the RFID tag according to the first embodiment of the present invention.

At Step S301, the control unit 25g sets the number of consecutive deviations to zero as an initial setting.

At Step S303, the control unit 25g sets the temperature deviation flag F and an end flag F to zero as initial settings. The control unit 25g enables the end flag according to an instruction from the mobile terminal 15.

At Step S305, the control unit 25g sets the light-emitting diode LED1 to an off-state as an initial setting.

At Step S307, the control unit 25g starts a loop.

At Step S309, the control unit 25g sets a measurement interval Δt (Δt=60 seconds, for example) in a timer.

At Step S311, the control unit 25g starts timing from the measurement interval Δt set in the timer.

At Step S313, the control unit 25g acquires temperature data from the temperature sensor 25d.

At Step S315, the control unit 25g determines whether the acquired temperature data is within the reference temperature range. The control unit 25g proceeds to Step S317 when having determined that the acquired temperature data is within the reference temperature range. On the other hand, when having determined that the acquired temperature data has deviated from the reference temperature range, the control unit 25g proceeds to Step S319.

At Step S317, the control unit 25g sets the number of consecutive deviations to zero and proceeds to Step S329.

At Step S319, the control unit 25g increments the number of consecutive deviations (+1).

At Step S321, the control unit 25g determines whether the number of consecutive deviations is equal to or more than a reference value. The control unit 25g proceeds to Step S329 when having determined that the number of consecutive deviations is equal to or more than the reference value. The control unit 25g proceeds to Step S323 when having determined that the number of consecutive deviations is not equal to or more than the reference value.

At Step S323, the control unit 25g sets the temperature deviation flag F to 1.

At Step S325, the control unit 25g stores date/time data when the temperature has deviated in the memory 25b.

At Step S327, the control unit 25g turns on the light-emitting diode LED1.

At Step S329, the control unit 25g starts a loop.

At Step S331, the control unit 25g determines whether the timing of the timer has reached zero. When having determined that the timing of the timer has reached zero, the control unit 25g proceeds to Step S334. On the other hand, when having determined that the timing of the timer has not reached zero, the control unit 25g proceeds to Step S333.

At Step S333, the control unit 25g returns to Step S329 to repeat the processing when the loop has not ended. On the other hand, when the loop has ended, the control unit 25g proceeds to Step S334.

At Step S334, the control unit 25g determines whether the end flag is 1. When having determined that the end flag is 1, the control unit 25g ends the processing of the present flowchart. When having determined that the end flag is zero, the control unit 25g proceeds to Step S335.

At Step S335, the control unit 25g returns to Step S307 to repeat the processing when the loop has not ended. On the other hand, when the loop has ended, the control unit 25g ends the present processing.

<Temperature Deviation Check Processing>

Figure 15:
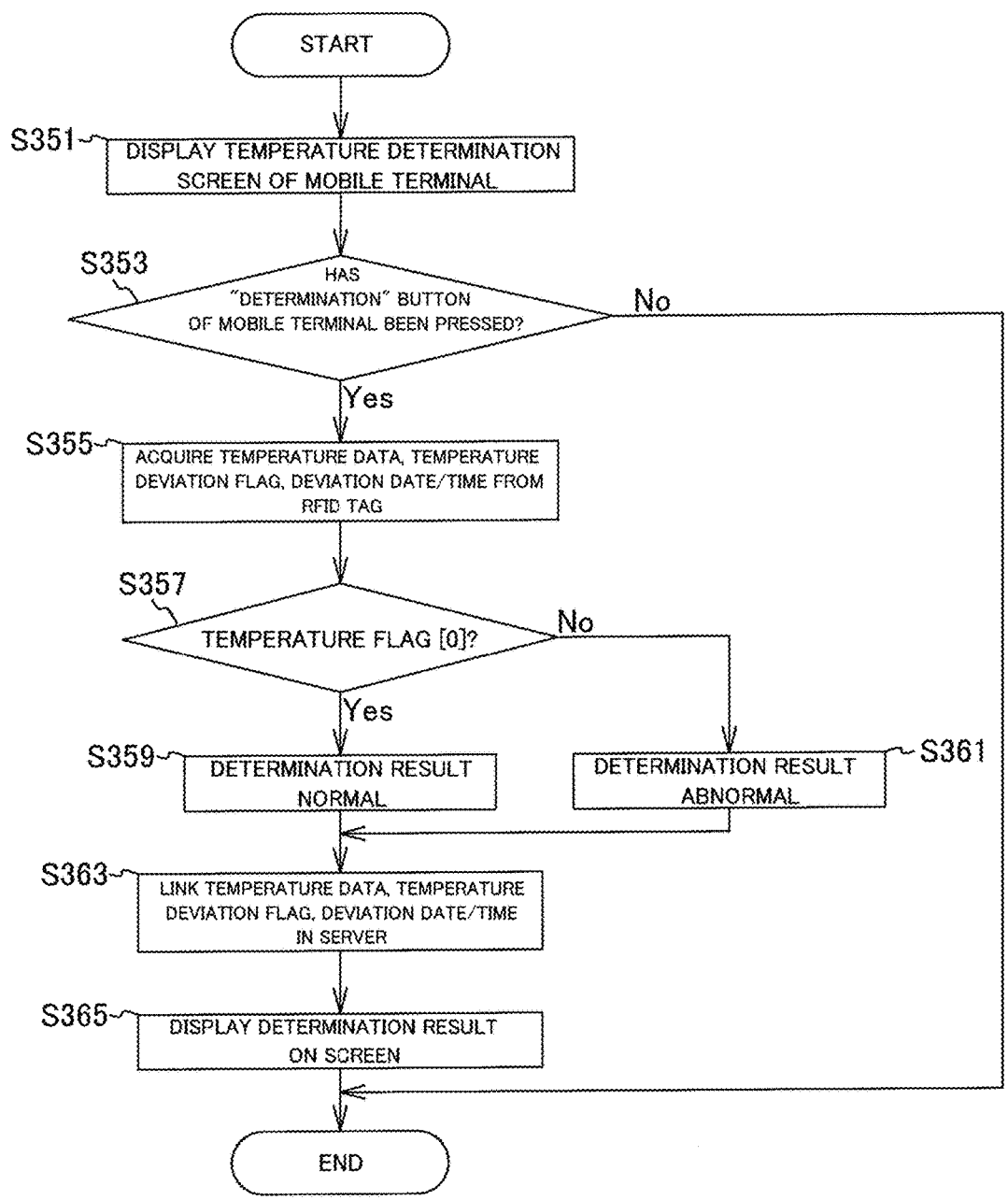
FIG. 15 is a flowchart illustrating temperature deviation check processing performed by the mobile terminal according to the first embodiment of the present invention.

FIG. 15 is a flowchart illustrating temperature deviation check processing performed by the mobile terminal according to the first embodiment of the present invention.

At Step S351, the determination unit 15d displays the temperature determination screen G5 of the mobile terminal 15.

At Step S353, the determination unit 15d determines whether a "determination" button G5a of the mobile terminal 15 has been pressed. When the "determination" button G5a has been pressed, the determination unit 15d proceeds to Step S355. On the other hand, when the "determination" button G5a has not been pressed, the determination unit 15d ends the processing.

At Step S355, the determination unit 15d acquires the temperature data, the temperature deviation flag F, and deviation date/time data from the RFID tag 25.

At Step S357, the determination unit 15d determines whether the temperature deviation flag F is zero. When having determined that the temperature deviation flag F is zero, the determination unit 15d proceeds to Step S359. On the other hand, when having determined that the temperature deviation flag F is not zero, the determination unit 15d proceeds to Step S361.

At Step S359, the determination unit 15d determines that the determination result is normal.

At Step S361, the determination unit 15d determines that the determination result is abnormal.

At Step S363, the determination unit 15d transmits the temperature data, the temperature deviation flag F, and the deviation date/time data to the article management server 11 for linkage.

At Step S365, the determination unit 15d displays the determination result on the temperature determination screen G5.

<Table and Graph Illustrating Temperature Deviation>

FIG. 16(a) is a table indicating temperature deviations and FIG. 16(b) is a graph indicating temperature deviations.

In a table H1, items such as the measurement time, the temperature (C°), the upper temperature threshold (C°), the lower temperature threshold (C°), the number of temperature deviations, and the temperature deviation flag are listed in the vertical direction, and actual values respectively corresponding to the items are listed in the horizontal direction as illustrated in FIG. 16(a).

Meanwhile, in a graph G9, the temperature (C°) is indicated in the vertical direction and the measurement time (clock time) in minutes is indicated in the horizontal direction as illustrated in FIG. 16(b).

For example, 8 C° is set as the upper temperature threshold and 2C° is set as the lower temperature threshold in the temperature deviation determination unit 25h as illustrated in FIG. 16(b).

The temperature increases from 5.3 C° to 6.5 C° in a range of the measurement time (clock time) from 9:00 to 9:03, and the temperature exceeds 8.0 C° due to some reason when the measurement time (clock time) is 9:04. Accordingly, the temperature deviation flag F changes from 0 (zero) to 1.

However, since the temperature falls below 8.0 C20 in a range between 9:05 and 9:08, the temperature deviation flag F changes 1 to 0 (zero).

Further, in a range between 9:09 and 9:11, the temperature exceeds 8.0 C° due to some reason and thus the number of temperature deviations becomes three. Consequently, the temperature deviation flag F changes 0 (zero) to 1.

Thereafter, the temperature deviation flag F keeps the state of 1 while the state in which the temperature is below 8.0 C° continues after 9:12. At this time, since the light-emitting diode LED1 is turned on in the state where the temperature deviation flag F is 1, it is notified that the temperature keeping environment of the articles has been in an abnormal state exceeding 8 C°.

<Deviation Threshold>

FIG. 17 is an ER diagram illustrating an association of deviation thresholds generated by the article management server 11 according to the first embodiment of the present invention.

<RFID Tag Management F7>

A control unit 11b of the article management server 11 generates an RFID tag management F7 by associating the tag group number, the use state, and the status with a tag ID, through input on an input screen (not illustrated).

The control unit 11b of the article management server 11 extracts the tag ID from the RFID tag management F7 using the tag ID as a key and acquires the tag group number, the use state, and the status.

<RFID Tag Group M5>

The control unit 11b of the article management server 11 generates an RFID tag group M5 by associating the upper temperature threshold, the lower temperature threshold, the measurement interval, and the number of consecutive deviations with the group number, through input on an input screen (not illustrated).

The control unit 11b of the article management server 11 extracts the group number from the RFID tag group M5 using the group number as a key and acquires the upper temperature threshold, the lower temperature threshold, the measurement interval, and the number of consecutive deviations.

With this RFID tag group M5, setting required for a deviation determination can be performed for each RFID tag.

<Outline of Traceability>

Figure 18:
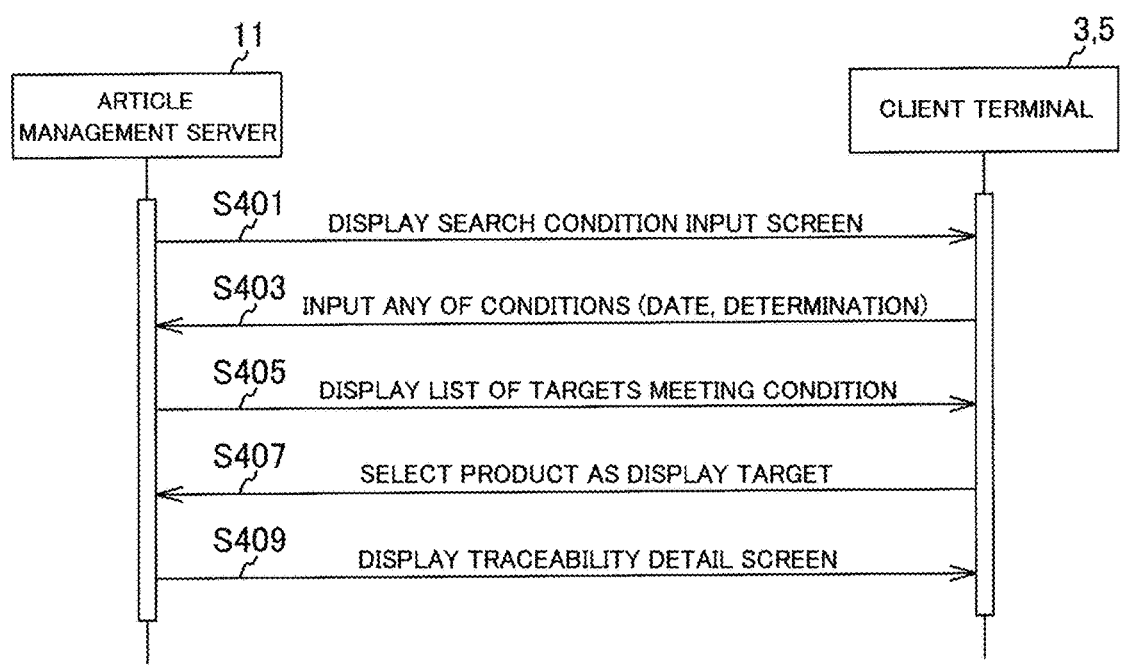
FIG. 18 is a sequence diagram illustrating an outline of traceability, to which the quality control system according to the first embodiment of the present invention is applied.

FIG. 18 is a sequence diagram illustrating an outline of traceability, to which the quality control system according to the first embodiment of the present invention is applied.

At Step S401, the article management server 11 transmits a "search condition input screen" (FIG. 19(a)) to the client terminal 3 or 5 in response to a transmission request from the client terminal 3 or 5, whereby the client terminal 3 or 5 displays the "search condition input screen".

At Step 403, the client terminal 3 or 5 inputs any of conditions ("date" or "determination") to the "search condition input screen" and transmits the condition to the article management server 11.

At Step S405, the article management server 11 searches the database for a list of targets meeting the condition from the client terminal 3 or 5 and transmits the list to the client terminal 3 or 5, whereby the client terminal 3 or 5 displays the list of targets.

At Step S407, the client terminal 3 or 5 selects a product as a display target and transmits the product to the article management server 11.

At Step S409, the article management server 11 transmits a "traceability detail screen" (FIG. 19(b)) for the product selected by the client terminal 3 or 5 to the client terminal 3 or 5, whereby the client terminal 3 or 5 displays the "traceability detail screen".

<Traceability List Screen>

FIG. 19(a) is a diagram illustrating a list screen of traceability and FIG. 19(b) is a diagram illustrating a result of search refinement.

As illustrated in FIG. 19(a), an input area where a hospital name, a date, and a determination can be input or selected is displayed on a traceability (list) screen Gil and conditions of data to be searched for can be designated by selecting a customer (a hospital name) and inputting or selecting a date or a determination.

When a "search refinement" key is pressed according to the designated conditions, a data list G13 based on the search conditions is displayed as illustrated in FIG. 19(b). The date, the product name, the transportation state, and the status are displayed in the horizontal direction as display items on the data list G13.

<Traceability Detail Screen>

FIG. 20 is a diagram illustrating a detail screen of traceability.

As illustrated in FIG. 20, a hospital name and a tag number (No) are shown on the traceability detail screen G15 and the dates and times, the product names, the PDA names, the transportation states, the statuses, and the temperature deviation times (clock times) are also displayed.

When the list screen G13 illustrated in FIG. 19(b) is displayed and data shown on the list screen G13 is selected, the screen transitions to the detail screen and a task, a temperature, a status, and the like corresponding to the article can be referred to.

<ER Diagram>

FIG. 21 is an ER diagram illustrating an association of files and masters generated by the article management server 11 according to the first embodiment of the present invention.

<Package Management F9>

The control unit 11b of the article management server 11 generates a package management file F9 by associating the number of the bag with which the product is packaged, the tag ID of the RFID tag, and the product code acquired from the mobile terminal 15.

The control unit 11b of the article management server 11 extracts the bag number from the package management file F9 using the bag number as a key and acquires the tag ID and the product code.

<RFID Tag Management F7>

The control unit 11b of the article management server 11 generates the RFID tag management F7 by associating the tag group number, the use state, and the status with the tag ID, through input on the input screen (not illustrated).

The control unit 11b of the article management server 11 extracts the tag ID from the RFID tag management F7 using the tag ID as a key and acquires the tag group number, the use state, and the status.

<RFID Tag Group M5>

The control unit 11b of the article management server 11 generates the RFID tag group M5 by associating the upper temperature threshold, the lower temperature threshold, the measurement interval, and the number of consecutive deviations with the group number, through input on the input screen (not illustrated).

The control unit 11b of the article management server 11 extracts the group number from the RFID tag group M5 using the group number as a key and acquires the upper temperature threshold, the lower temperature threshold, the measurement interval, and the number of deviations.

With this RFID tag group M5, setting required for a deviation determination can be performed for each RFID tag.

<Tag Temperature History F1>

The control unit 11b of the article management server 11 generates the tag temperature history F1 by associating the bag number, the temperature, and the deviation flag with the tag ID and the date and time acquired from the mobile terminal 15.

The control unit 11b of the article management server 11 extracts the tag ID and the date and time from the tag temperature history F1 using the tag ID and the date and time as keys and acquires the bag number, the temperature, and the deviation flag.

<Trace F3>

The control unit 11b of the article management server 11 generates the trace F3 by associating the date and time, the bag number, the product code, and the terminal ID with the task ID and the tag ID acquired from the mobile terminal 15.

The control unit 11b of the article management server 11 extracts the task ID and the tag ID from the trace F3 using the task ID and the tag ID as keys and acquires the date and time, the bag number, the product code, and the terminal ID.

The trace F3 is status information related to a task.

<Mobile Terminal Management F11>

The control unit 11b of the article management server 11 generates a mobile terminal management F11 by associating the installation place and the task ID with the terminal ID, through input on an input screen (not illustrated).

The control unit 11b of the article management server 11 extracts the terminal ID from the mobile terminal management F11 using the terminal ID as a key and acquires the installation place and the task ID.

The mobile terminal management F11 is management information for a mobile terminal performing tasks.

<Task M13>

The control unit 11b of the article management server 11 generates a task M13 by associating the task name with the task ID through input on an input screen (not illustrated).

The control unit 11b of the article management server 11 extracts the task ID from the task M13 using the task ID as a key and acquires the task name.

The task M13 is task information in a period until products are delivered from a logistics center to a customer and are administered to patients.

Second Embodiment

Figure 22:
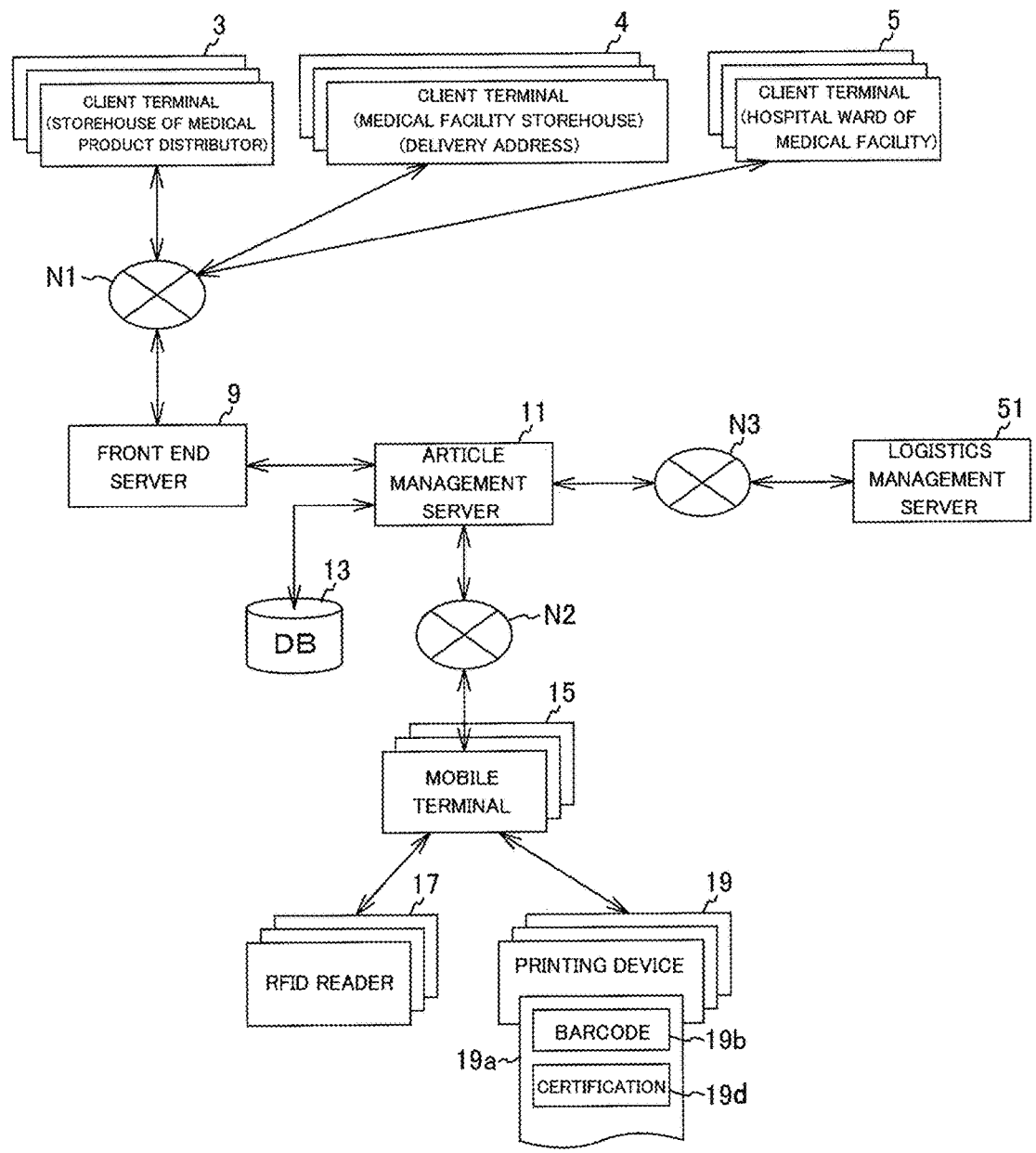
FIG. 22 is a block diagram illustrating a configuration of a quality control system according to a second embodiment of the present invention.

FIG. 22 is a block diagram illustrating a configuration of the quality control system according to a second embodiment of the present invention. Among the reference signs illustrated in FIG. 22, reference signs identical to those illustrated in FIG. 1 have identical configurations so that explanations thereof are omitted.

In the second embodiment, for example, a process from when pharmaceutical products are shipped from a storehouse of a medical product distributor until when the pharmaceutical products are administered to patients is explained.

The quality control system 1 includes the client terminal (a medical product distributor storehouse) 3, a client terminal (a medical facility storehouse) 4, the client terminal (a hospital ward) 5, the communication networks N1 and N2, a communication network N3, the article management server (deliverer) 11, the database DB13, the mobile terminal 15, the RFID reader 17, the printing device 19, and a logistics management server 51.

The logistics management server 51 performs data communication with the article management server (deliverer) 11 via the communication network N3 and manages the logistics state.

The logistics management server 51 includes therein a ROM (Read Only Memory), a RAM (Random Access Memory), a CPU (Central Processing Unit), and an HDD (Hard Disk Drive), reads an operating system OS from the HDD and loads the OS on the RAM to activate the OS, and reads programs (programs indicated by various flowcharts described later) from the HDD to perform various processes under control of the OS.

<Outline of Delivery Container>

Figure 23:
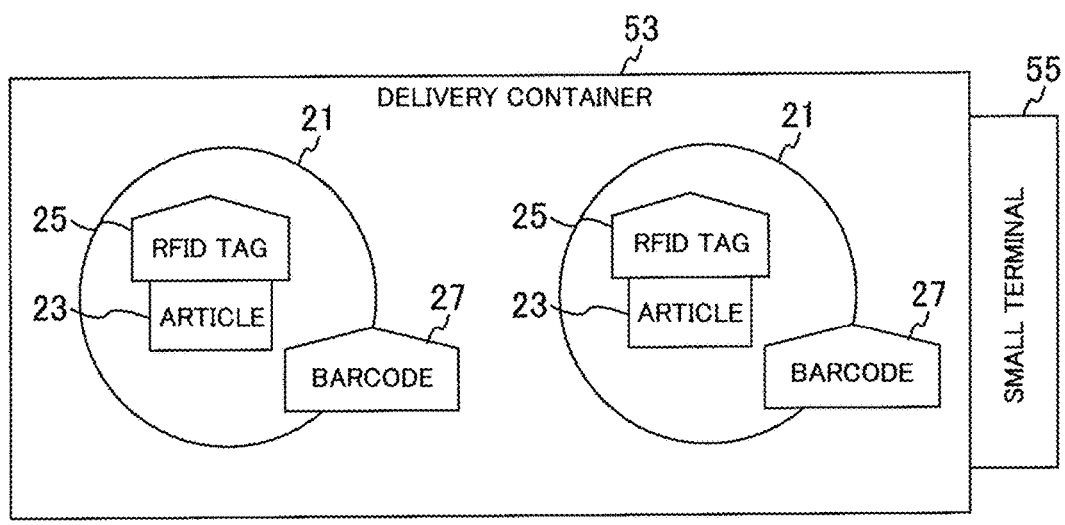
FIG. 23 is a diagram illustrating an outline of bags and articles accommodated in a delivery container.

FIG. 23 is a diagram illustrating an outline of bags and articles accommodated in a delivery container.

As illustrated in FIG. 23, the article 23 and an RFID tag 25 are accommodated in each bag 21 and a tag having a barcode printed thereon is provided on a zip fastener part for opening and closing the bag 21. Two bags 21 are accommodated in the delivery container 53.

A small terminal 55 is placed on a side surface of the delivery container 53. The RFID tag 25 is an example of the temperature measurement device described above.

<Hardware Configuration of Delivery Container and Small Terminal>

Figure 24:
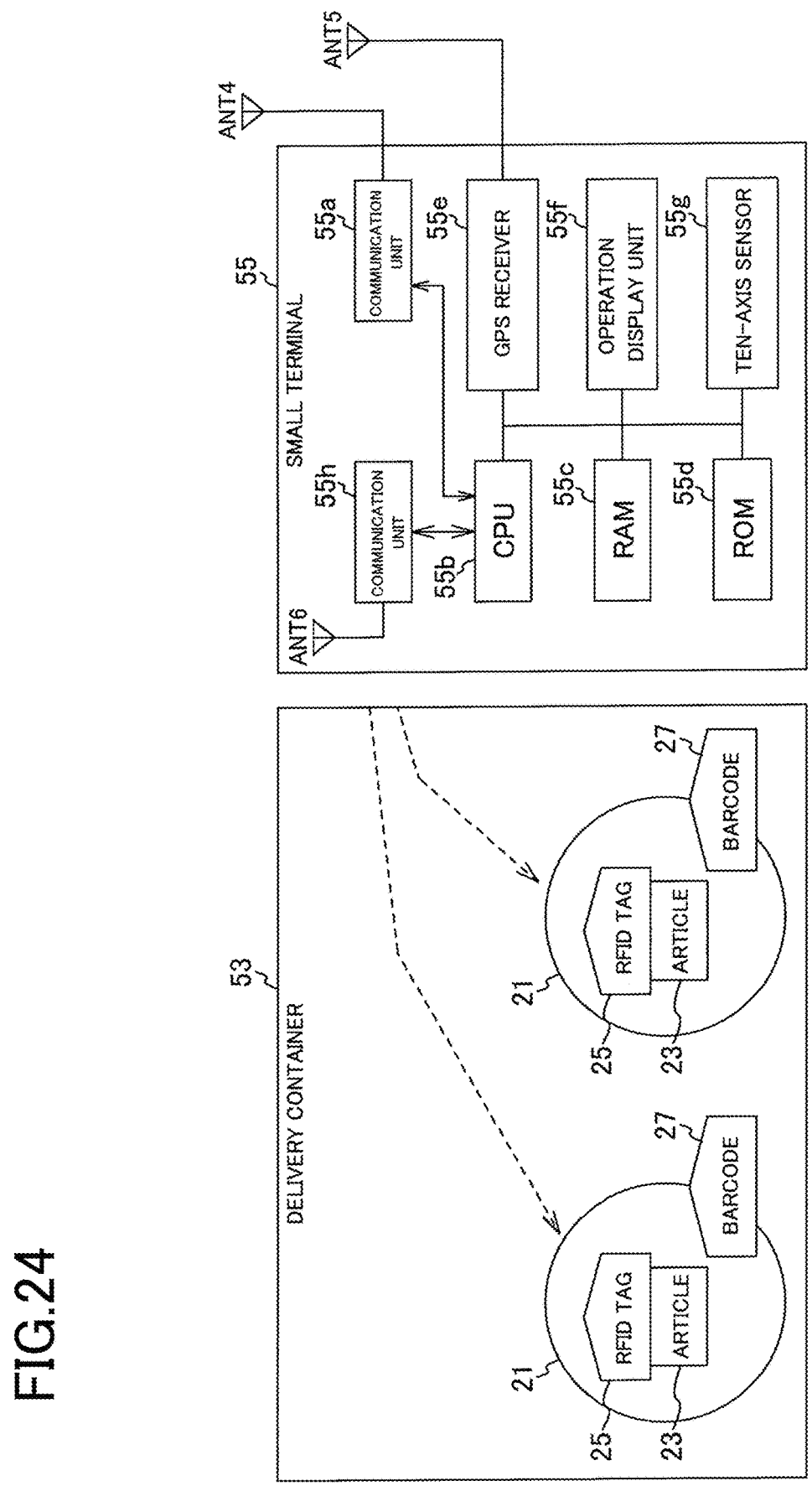
FIG. 24 is a diagram illustrating a hardware configuration of a delivery container and a small terminal according to the second embodiment of the present invention.

FIG. 24 is a diagram illustrating a hardware configuration of the delivery container and the small terminal according to the second embodiment of the present invention.

The delivery container 53 accommodates the bags 21 each accommodating the article 23 and the RFID tag 25 as described above, and the RFID tag 25 and the small terminal 55 communicate with each other using a frequency in the UHF band.

The small terminal 55 includes a communication unit 55a, a CPU 55b, a RAM 55c, a ROM 55d, a GPS receiver 55e, an operation display unit 55f, and a ten-axis sensor 55g.

The communication unit 55a has an antenna ANT4 and transmits and receives data to/from the article management server 11 via the communication network N2.

The CPU 55b controls the entire operation of a delivery unit in accordance with programs previously stored in the ROM 55d using the RAM 55c as a work memory.

The RAM 55c is a volatile memory medium capable of high-speed read and write of information and can be used as a work memory.

The ROM 55d is a read-only non-volatile memory medium and has stored therein firmware and various kinds of data.

The GPS receiver 55e receives a radio signal from a plurality of GPS satellites via the antenna ANT5 to calculate location information of the delivery unit 17A, and transmits the calculated location information to the article management server 11 via the communication network N2.

The operation display unit 55f includes a screen and key buttons for displaying a menu for performing various settings and mode selection, and receives various operation requests from a user.

The ten-axis sensor 55g is an inertia measurement unit corresponding to ten-axis measurement, and is a compound sensor in which a three-axis angular velocity sensor (a gyroscope sensor), a three-axis acceleration sensor, a three-axis magnetic sensor, and a pressure sensor are sealed in one package, and is arranged in the small terminal so as to be in contact with a side surface of the delivery container 53.

A communication unit 55h has an antenna ANT6 and transmits and receives data to/from the RFID tag 25 via a radio wave.

<Sequence Diagram of Task Procedure>

Figure 25:
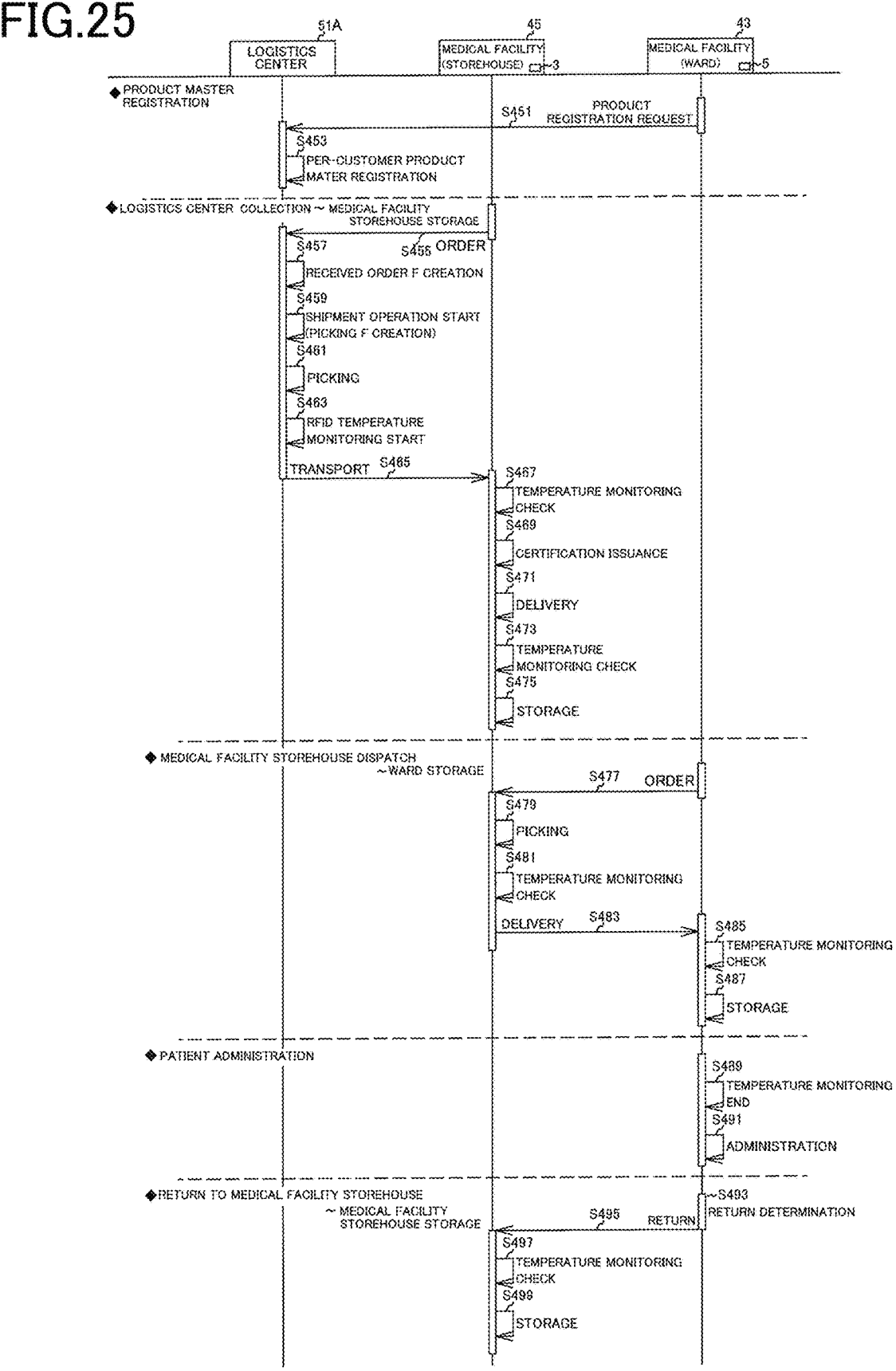
FIG. 25 is a sequence diagram illustrating an overall task procedure of the quality control system according to the second embodiment of the present invention.

FIG. 25 is a sequence diagram illustrating an overall task procedure of the quality control system according to the second embodiment of the present invention.

In the second embodiment, the RFID tags are enclosed along with target products at the time of shipment from a logistics center to perform the temperature deviation monitoring. At the time of delivery, a temperature logger is attached to a delivery container to acquire a temperature history in units of cases. At this time, the products and the cases are associated with each other after subjected to data processing.

<Registration on Product Mater>

At Step S451, the client terminal 5 provided in the medical facility (hospital ward) 43 transmits a product registration request.

At Step S453, the logistics management server 51 provided in the logistics center 51A performs registration on a per-customer product master M19 in response to the received product registration request.

<Logistics Center: From Shipment to Storage Into Medical Facility Storehouse>

A task procedure from when articles are shipped from the logistics center until when the articles are stored in a medical facility storehouse is explained first.

At Step S455, the client terminal 3 provided in the medical facility storehouse 45 performs registration on the ordering screen as an ordering task. At this time, the logistics management server 51 provided in the logistics center 51A receives order information.

At Step S457, the logistics management server 51 creates a received order file F21 in the logistics center 51A.

At Step S459, the logistic server 51 creates a picking file F23 and starts a shipment operation.

At Step S461, as the shipment operation, a shipment operator refers to a slip to pick a required number of articles from a plurality of stocked articles, places the articles into the containers 21 (bags), and further stores the articles in the delivery container 53.

Next, at Step S463, the shipment operator operates the mobile terminal 15 to activate the temperature measurement device 25A and start temperature monitoring.

The delivery container 53 is mounted on a vehicle.

At Step S465, transport of the delivery container 53 from the logistics center 51A to the medical facility storehouse 45 is started.

At Step S467, the temperature of the articles accommodated in the delivery container 53 is monitored and checked in the medical facility storehouse 45.

At Step S469, certification data is transmitted from the mobile terminal 15 to the printing device 19 and a quality certification is issued from the printing device 19.

At Step S471, the articles accommodated in the delivery container 53 are delivered to the medical facility storehouse 45.

At Step S473, the temperature monitoring is performed and checked.

At Step S475, the articles are taken out of the delivery container 53 in the medical facility storehouse 45 and are stored in the refrigerator 27.

<Dispatch from Medical Facility Storehouse and Storage Into Hospital Ward>

At Step S477, the client terminal 5 provided in the medical facility ward 43 performs registration on an ordering screen as an ordering task. At this time, the client terminal 4 provided in the medical facility storehouse 45 receives the order information.

At Step S479, a slip is referred to, a required number of articles are picked out of a plurality of stocked articles, and the articles are accommodated in containers 21 (bags) and are further stored in the delivery container 53 as a dispatching operation.

At Step S481, the temperature of the articles accommodated in the delivery container 53 is monitored and checked in the medical facility storehouse 45.

At Step S483, transport of the delivery container 53 from the medical facility storehouse 45 to the medical facility ward 43 is started.

At Step S485, the temperature monitoring is performed and checked.

At Step S487, the articles are taken out of the delivery container 53 and are stored in the refrigerator 27 in the medical facility ward 43.

<Patient Administration>

A task procedure at a time when pharmaceutical products as the articles are administered to patients is explained next.

At Step S489, the temperature monitoring is ended.

At Step S491, the lid of the delivery container 53 is opened, the pharmaceutical products (articles) are taken out of the delivery container 53, and the pharmaceutical products are administered to patients.

<Return of Pharmaceutical Products>

A procedure of returning the pharmaceutical products is explained next.

At Step S493, a determination of return of the pharmaceutical products is performed when unadministered pharmaceutical products remain at a time when health professionals have administered the pharmaceutical products to patients, or when health professionals have not administered the pharmaceutical products to patients.

At Step S495, transport of the delivery container 53 from the hospital ward 43 to the medical facility storehouse 45 is started.

At Step S497, the temperature of the articles accommodated in the delivery container 53 is monitored and checked.

At Step S499, the bagged pharmaceutical products are taken out of the delivery container 53 and are stored in the refrigerator 27.

<Sequence Diagram Illustrating Shipment Preparing Task>

Figure 26:
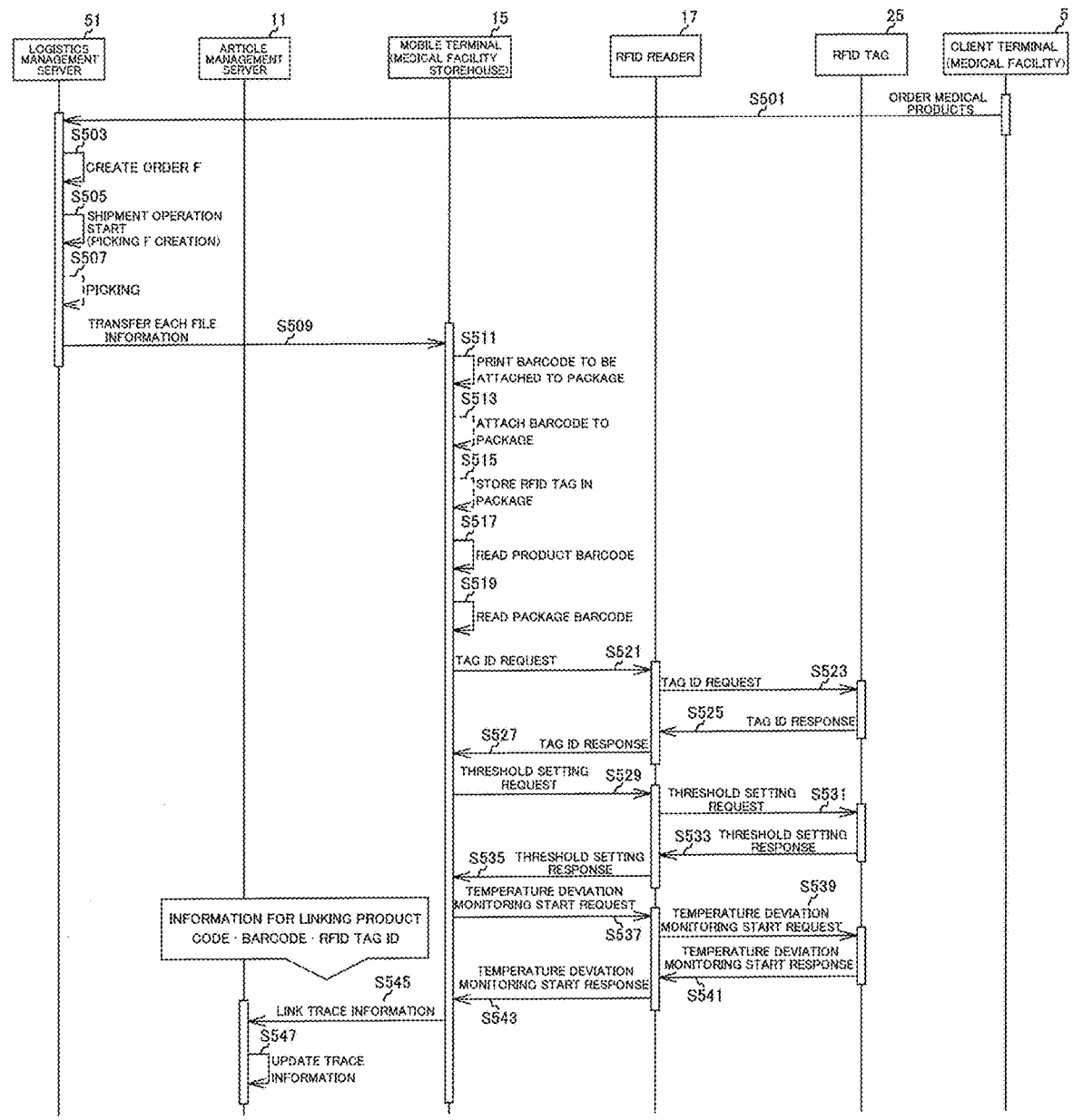
FIG. 26 is a sequence diagram illustrating a task in which an order is received from a medical facility and shipment is prepared in a medical product distributor, to which the quality control system according to the second embodiment of the present invention is applied.

FIG. 26 is a sequence diagram illustrating a task in which an order is received from a medical facility and shipment is prepared in a medical product distributor, to which the quality control system according to the second embodiment of the present invention is applied.

At Step S501, the client terminal 5 provided in the medical facility performs registration on the ordering screen as an ordering task. At this time, the logistics management server 51 provided in the logistics center 51A receives the order information.

At Step S503, the logistics management server 51 in the logistic center 51 creates a received order file F21 on the basis of the received order information from the client terminal 5 provided in the medical facility.

At Step S505, the logistic server 51 creates a picking file F23 based on the received order information and starts a shipment operation.

At Step S507, a slip is referred to, and a required number of articles are picked out of a plurality of stocked articles to store the articles in a delivery container 53 as the shipment operation.

At Step S509, picking file F information for identifying the target product, package management file F information for printing the package barcode, and RFID tag group master M information for setting threshold information of the RFID tag are transferred.

At Step S511, a barcode to be attached to the package is printed on a sheet.

At Step S513, the barcode is attached to the package.

At Step S515, the product and the RFID tag are stored in the package.

At Step S517, barcode information is read from the product barcode attached to the package using the mobile terminal 15.

At Step S519, barcode information is read from a barcode attached to the package using the mobile terminal 15.

At Step S521, the mobile terminal 15 transmits a tag ID request to the RFID reader 17.

At Step S523, the RFID reader 17 transmits a tag ID request to the RFID tag 25.

At Step S525, the RFID tag 25 reads the tag ID from the memory and responds to the RFID reader 17 by transmitting the tag ID thereto.

At Step S527, the RFID reader 17 responds to the mobile terminal 15 by transmitting thereto the tag ID received from the RFID tag 25.

At Step S529, the mobile terminal 15 transmits a threshold setting request to the RFID reader 17.

At Step S531, the RFID reader 17 transmits a threshold setting request to the RFID tag 25.

At Step S533, the RFID tag 25 sets thresholds in the memory and responds to the RFID reader 17 by transmitting thereto the effect that the thresholds have been set.

At Step S535, the RFID reader 17 responds to the mobile terminal 15 by transmitting thereto the effect that the thresholds have been set, which is received from the RFID tag 25.

At Step S537, the mobile terminal 15 transmits a temperature deviation monitoring start request to the RFID reader 17.

At Step S539, the RFID reader 17 transmits a temperature deviation monitoring start request to the RFID tag 25.

At Step S541, the RFID tag 25 starts the temperature deviation monitoring in response to the temperature deviation monitoring start request and responds to the RFID reader 17 by transmitting thereto the effect that the temperature deviation monitoring has been started.

At Step S543, the RFID reader 17 responds to the mobile terminal 15 by transmitting thereto the effect that the temperature deviation monitoring has been started, which is received from the RFID tag 25.

At Step S545, the mobile terminal 15 transmits the task status, the temperature, the temperature deviation flag, and the date and time to the article management server 11 to link the trace information.

At Step S547, the article management server 11 updates the task status, the temperature, the temperature deviation flag, and the date and time received from the mobile terminal 15 as the trace information.

<Sequence Diagram Illustrating Delivery Task>

Figure 27:
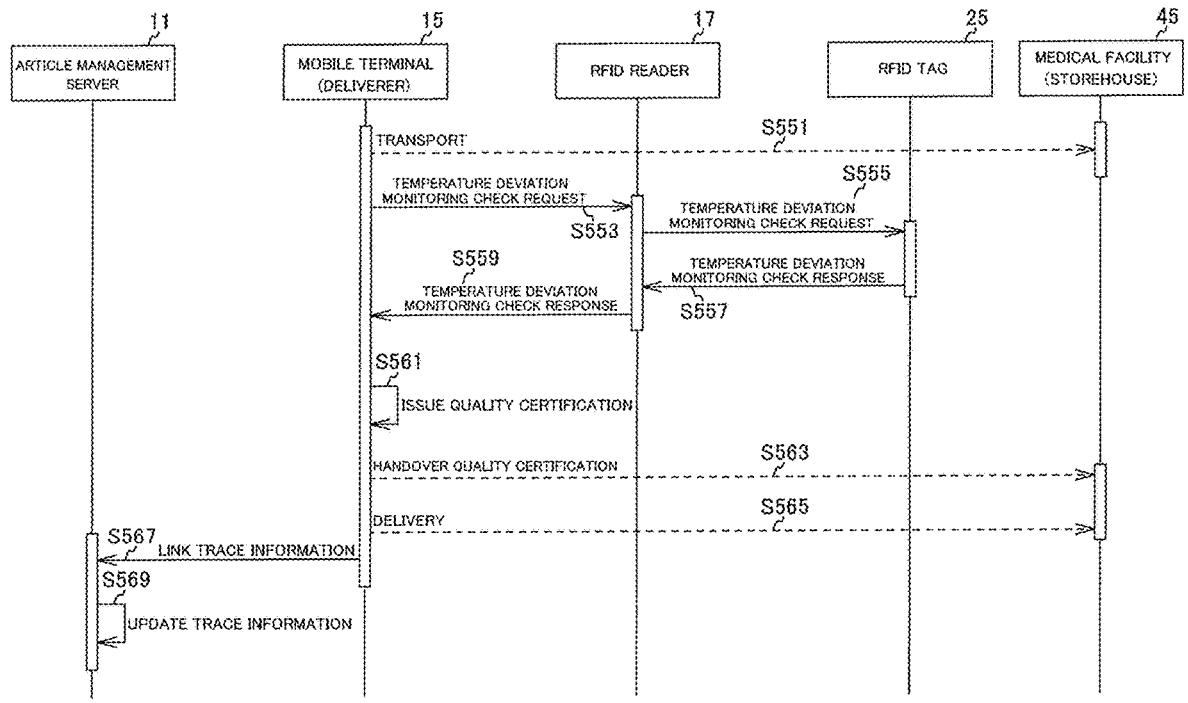
FIG. 27 is a sequence diagram illustrating a task from shipment from a medical product distributor to delivery to a medical facility, to which the quality control system according to the second embodiment of the present invention is applied.

FIG. 27 is a sequence diagram illustrating a task from shipment from a medical product distributor to delivery to a medical facility, to which the quality control system according to the second embodiment of the present invention is applied.

At Step S551, a deliverer carrying the mobile terminal 15 transports the delivery container 53 accommodating medicines from a medical product distributor to the medical facility storehouse 45.

At Step S553, the mobile terminal 15 transmits a temperature deviation monitoring check request to the RFID reader 17.

At Step S555, the RFID reader 17 transmits a temperature deviation monitoring check request to the RFID tag 25.

At Step S557, the RFID tag 25 checks the temperature deviation monitoring in response to the temperature deviation monitoring check request and responds to the RFID reader 17 by transmitting thereto a temperature deviation monitoring check.

At Step S559, the RFID reader 17 responds to the mobile terminal 15 by transmitting thereto the temperature deviation monitoring check received from the RFID tag 25.

At Step S561, the deliverer accesses the attached terminal 55 of the delivery container 53 through the mobile terminal 15 to acquire quality certification data of the articles and causes the printing device to print a quality certification to be issued.

At Step S563, the deliverer hands over the printed quality certification to a staff in the medical facility storehouse.

Simultaneously, at Step S565, the deliverer hands over the packaged articles to the staff in the medical facility storehouse.

At this time, the staff in the medical facility stores the medicines in the refrigerator 27 of the medical facility storehouse.

At Step S567, the mobile terminal 15 transmits the task status, the temperature, the temperature deviation flag, and the date and time to the article management server 11 to link the trace information.

At Step S569, the article management server 11 updates the task status, the temperature, the temperature deviation flag, and the date and time received from the mobile terminal 15 as the trace information.

<Sequence Diagram Illustrating Storage Task>

Figure 28:
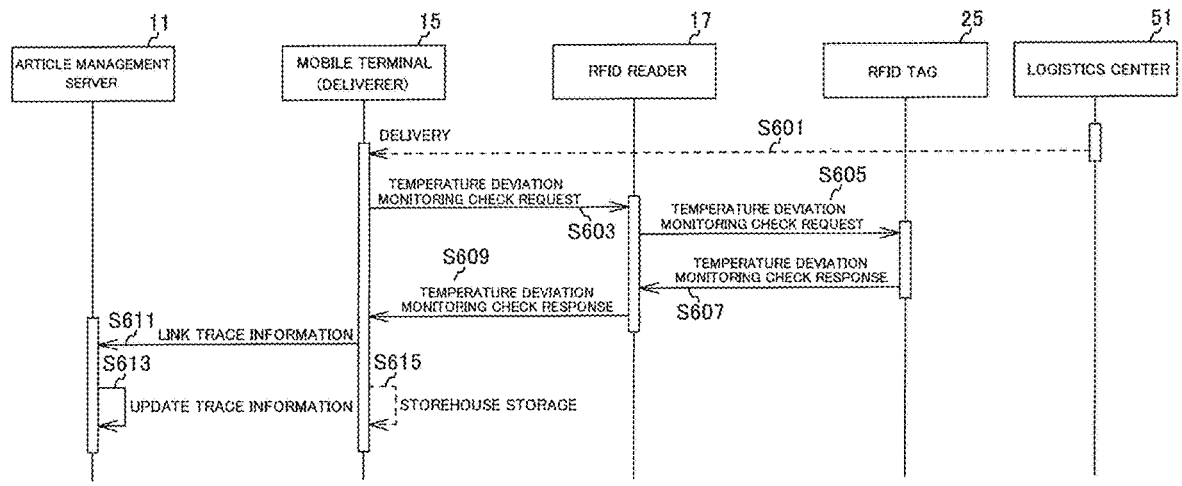
FIG. 28 is a sequence diagram illustrating a task from delivery to a medical facility to storage into a medical facility (a storehouse), to which the quality control system according to the second embodiment of the present invention is applied.

FIG. 28 is a sequence diagram illustrating a task from delivery to a medical facility to storage into a medical facility (a storehouse), to which the quality control system according to the second embodiment of the present invention is applied.

At Step S601, a deliverer carrying the mobile terminal 15 delivers the delivery container 53 accommodating medicines from the logistics center 51 to a medical facility storehouse.

At Step S603, the mobile terminal 15 transmits a temperature deviation monitoring check request to the RFID reader 17.

At Step S605, the RFID reader 17 transits a temperature deviation monitoring check request to the RFID tag 25.

At Step S607, the RFID tag 25 checks the temperature deviation monitoring in response to the temperature deviation monitoring check request and responds to the RFID reader 17 by transmitting thereto a temperature deviation monitoring check.

At Step S609, the RFID reader 17 responds to the mobile terminal 15 by transmitting thereto the temperature deviation monitoring check received from the RFID tag 25.

At Step S611, the mobile terminal 15 transmits the task status, the temperature, the temperature deviation flag, and the date and time to the article management server 11 to link the trace information.

At Step S613, the article management server 11 updates the task status, the temperature, the temperature deviation flag, and the date and time received from the mobile terminal 15 as the trace information.

At Step S615, the deliverer carrying the mobile terminal 15 stores the delivery container 53 accommodating the medicines in the refrigerator 27 of the medical facility storehouse.

<Sequence Diagram Illustrating Dispatching Task>

Figure 29:
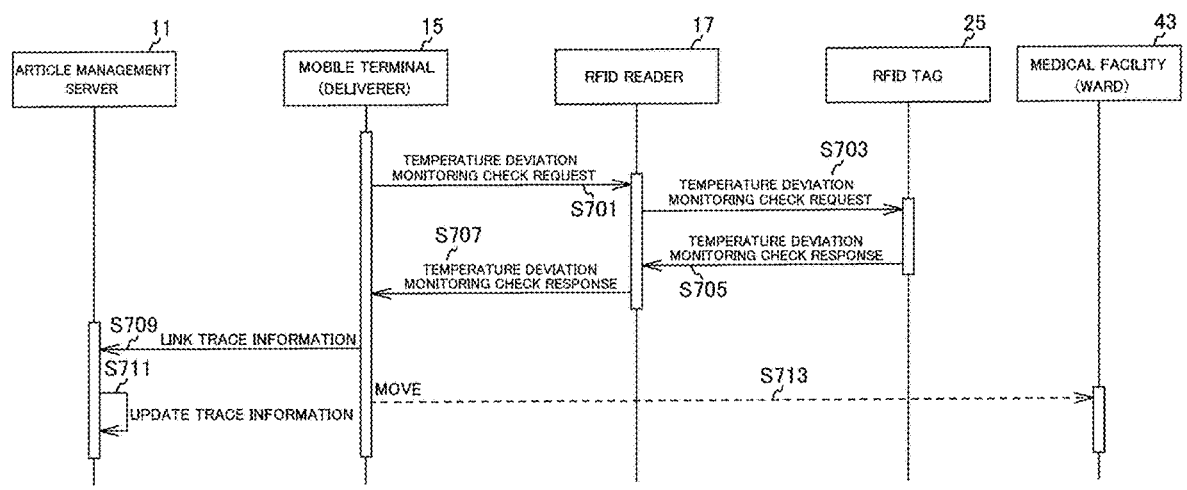
FIG. 29 is a sequence diagram illustrating a task of dispatching from a medical facility (a storehouse) to a hospital ward, to which the quality control system according to the second embodiment of the present invention is applied.

FIG. 29 is a sequence diagram illustrating a task of dispatching from a medical facility (a storehouse) to a hospital ward, to which the quality control system according to the second embodiment of the present invention is applied.

At Step S701, the mobile terminal 15 transmits a temperature deviation monitoring check request to the RFID reader 17.

At Step S703, the RFID reader 17 transmits a temperature deviation monitoring check request to the RFID tag 25.

At Step S705, the RFID tag 25 checks temperature deviation monitoring in response to the temperature deviation monitoring check request and responds to the RFID reader 17 by transmitting thereto a temperature deviation monitoring check.

At Step S707, the RFID reader 17 responds to the mobile terminal 15 by transmitting thereto the temperature deviation monitoring check received from the RFID tag 25.

At Step S709, the mobile terminal 15 transmits the task status, the temperature, the temperature deviation flag, and the date and time to the article management server 11 to link the trace information.

At Step S711, the article management server 11 updates the task status, the temperature, the temperature deviation flag, and the date and time received from the mobile terminal 15 as the trace information.

At Step S713, a staff in the medical facility carrying the mobile terminal 15 moves the delivery container 53 accommodating the medicines to the hospital ward 43 and stores the delivery container 53 in the refrigerator 27 in the storehouse.

<Sequence Diagram Illustrating Storage Task>

A sequence diagram illustrating a task of storing from a medical facility (a storehouse) to a medical facility (a hospital ward), to which the quality control system according to the second embodiment of the present invention is applied, is identical to that in FIG. 7.

In the second embodiment, a task flow of dispatch from a medical facility (a storehouse) and administration to patients and a task flow of return from a medical facility (a hospital ward) to a medical facility (a storehouse) are identical to those in the first embodiment (FIG. 9).

<System Configuration Diagram>

Figure 30:
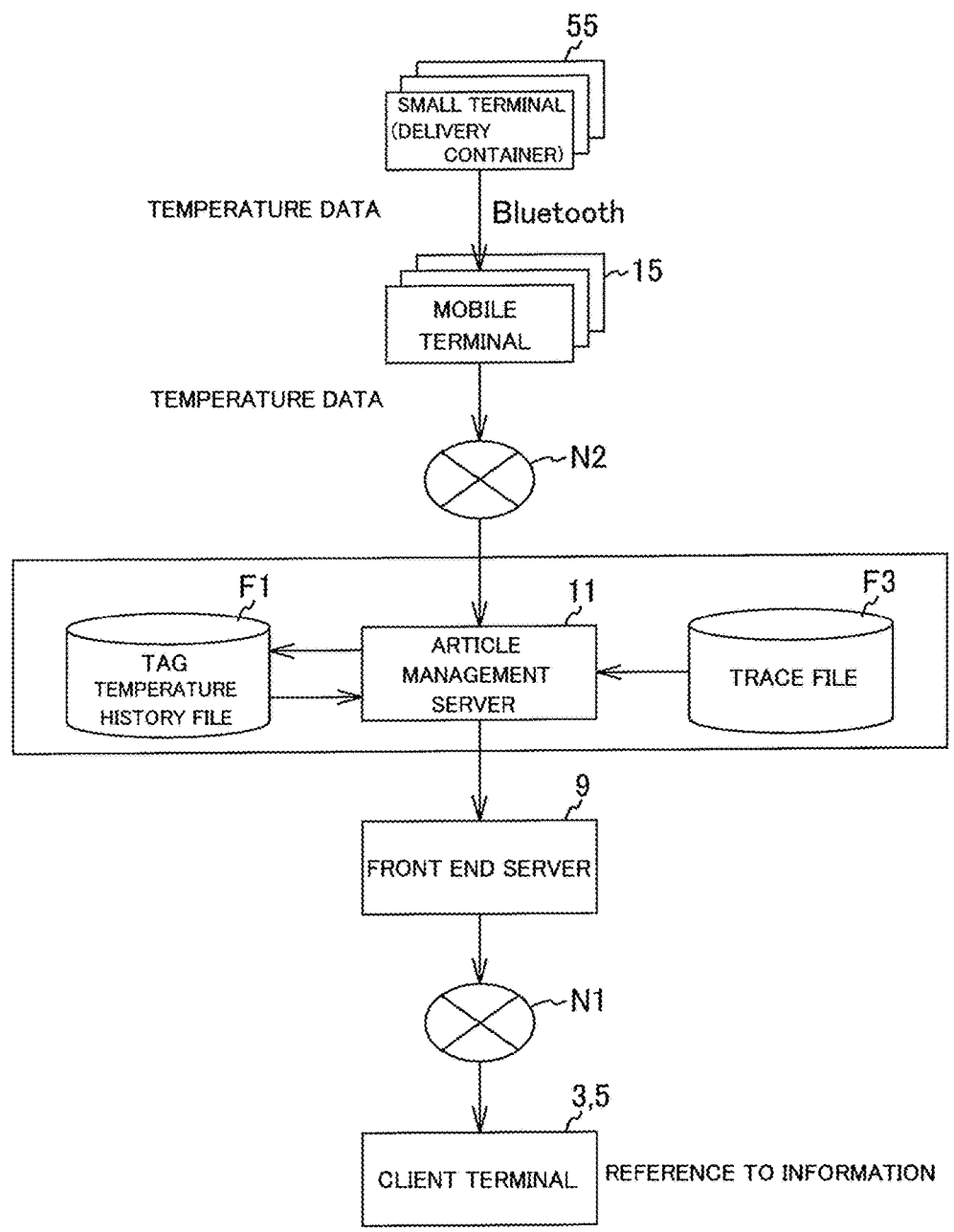
FIG. 30 is a system configuration diagram illustrating acquisition of temperature data according to the second embodiment of the present invention.

FIG. 30 is a system configuration diagram illustrating acquisition of temperature data according to the second embodiment of the present invention.

The quality control system 50 includes the small terminal 55, the mobile terminal 15, the communication network N2, the article management server 11, the tag temperature history file F1, the trace file F3, the front end server 9, the communication network N1, and the client terminals 3 and 5.

The small terminal 55 is placed on a side surface of the delivery container 53.

<ER Diagram>

Figure 31:
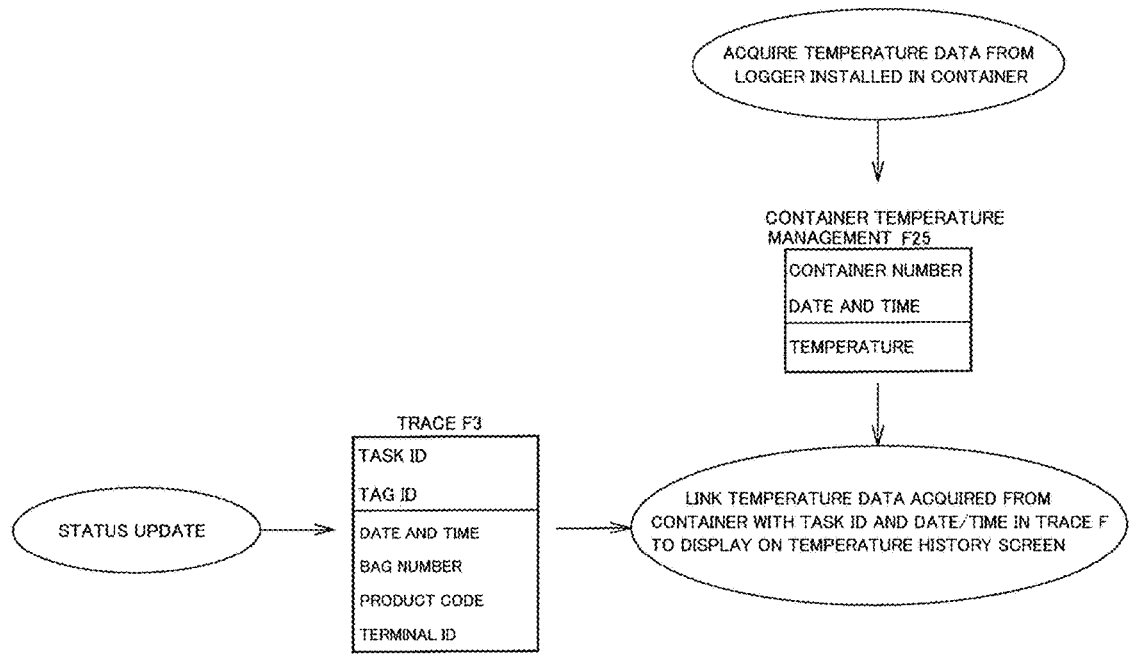
FIG. 31 is an ER diagram illustrating an association at a time when a temperature is acquired, which is generated by an article management server according to the second embodiment of the present invention.

FIG. 31 is an ER diagram illustrating an association at a time when a temperature is acquired, which is generated by the article management server according to the second embodiment of the present invention.

The article management server 11 acquires the temperature data, the container number, and the date/time data from the small terminal 55 via the mobile terminal 15 to generate a container temperature management file F25 and stores the container temperature management file F25 in the temperature storage unit 13a of the database DB13.

When the task ID being status information received from the mobile terminal 15 and indicating task contents is updated, the article management server 11 associates the task ID with the date/time data to update the date/time data, the bag number, the product code, and the terminal ID stored in the trace file F3.

Further, when update of the task ID being the status information indicating task contents occurs, the article management server 11 associates the temperature deviation data acquired from the tag temperature history file F1 with the task ID and the date/time data acquired from the trace file F3 to generate the temperature history screen G23.

<Print Data Edition Processing>

Figure 32:
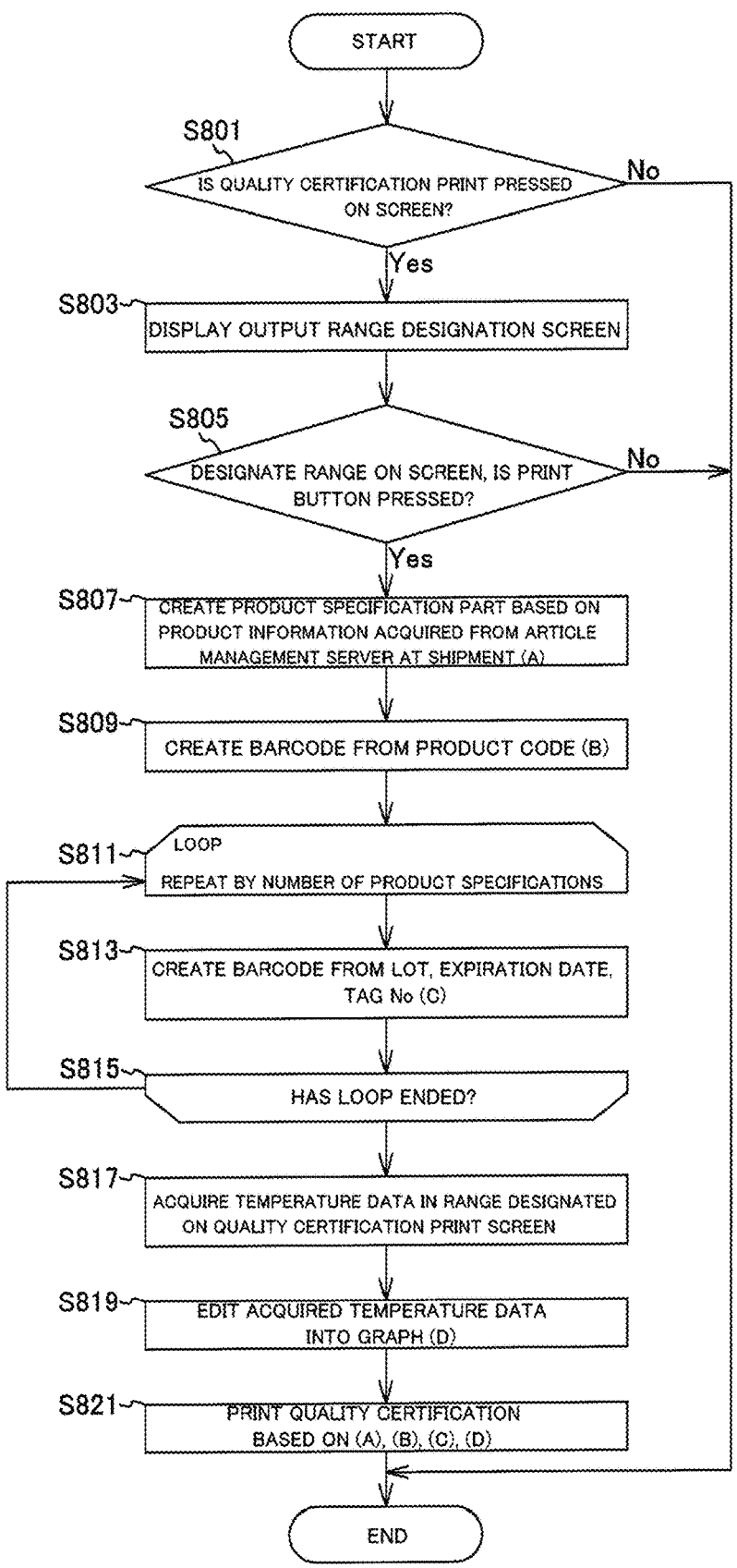
FIG. 32 is a flowchart illustrating print data edition processing performed by the article management server according to the second embodiment of the present invention.

FIG. 32 is a flowchart illustrating print data edition processing performed by the article management server according to the second embodiment of the present invention.

At Step S801, the mobile terminal 15 determines whether a quality certification print button (not illustrated) displayed on the screen is pressed. At this time, the mobile terminal 15 proceeds to Step S803 when having determined that the quality certification print button is pressed and ends the processing when having determined that the quality certification print button is not pressed.

At Step S803, the mobile terminal 15 displays an output range designation screen.

At Step S805, the mobile terminal 15 designates a range displayed on the screen and determines whether the quality certification print button is pressed. At this time, the mobile terminal 15 proceeds to Step S807 when having determined that the quality certification print button is pressed, and ends the processing when having determined that the quality certification print button is not pressed.

At Step S807, the mobile terminal 15 creates a product specification part (FIG. 33(a)) on the basis of product information acquired from the article management server 11 at the time of shipment (A).

At Step S809, the mobile terminal 15 performs edition on the basis of the product code to obtain a barcode (FIG. 33(b)) (B).

At Step S811, the mobile terminal 15 repeats the above processing by the number of product specifications as loop processing.

At Step S813, the mobile terminal 15 edits the lot, the expiration date, and the tag ID into a barcode (FIG. 33(c)) on the basis of the product specification information (C).

At Step S815, the mobile terminal 15 ends the loop processing after having repeated by the number of product specifications and proceeds to Step S817.

At Step S817, the mobile terminal 15 acquires temperature data in a range designated on a quality certification print screen.

At Step S817, the mobile terminal 15 may increase the storage capacity of a data logger and acquire temperature data being quality data from the data logger, instead of acquiring the temperature data being the quality data from the database DB13 via the article management server 11.

At Step S819, the mobile terminal 15 edits a graph (FIG. 33(d)) on the basis of the acquired temperature data (D).

At Step S821, the mobile terminal 15 edits quality certification data on the basis of the edited data (A), (B), (C), and (D), supplies the quality certification data to the printing device 19, and causes the printing device 19 to print a quality certification 19a (FIG. 33).

<Temperature Quality Certification>

FIG. 33 are diagrams respectively illustrating parts of a temperature quality certification output from the printing device according to the second embodiment of the present invention, where (a) illustrates a product specification part, (b) illustrates a barcode indicating a product code, (c) illustrates a barcode representing a lot, an expiration date, and a tag ID, and (d) is a graph representing transitions of temperature data.

The temperature quality certification is output at the time of delivery from a logistics center to a customer, and information of articles, barcodes thereof, and a temperature graph are output.

When a search button B21 included in a search condition input screen G17 illustrated in FIG. 35 is pressed, the quality certification illustrated in FIG. 33 is printed.

As illustrated in FIG. 33, the product code (b) such as the article code, the lot number, the expiration date, and the tag number, the barcode (c) such as the lot number, the expiration date, and the tag number, and the temperature graph (d) are arranged in addition to the product specification part (a) in the quality certification.

<Outline of Traceability>

Figure 34:
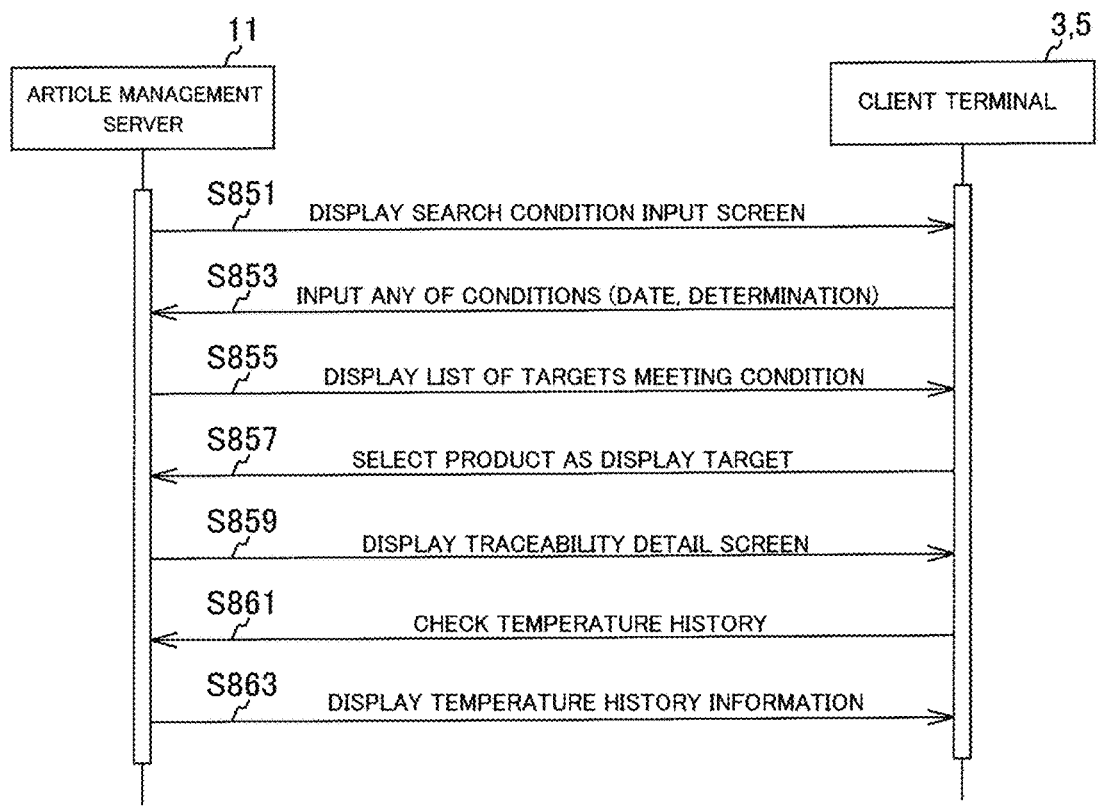
FIG. 34 is a sequence diagram illustrating an outline of traceability, to which the quality control system according to the second embodiment of the present invention is applied.

FIG. 34 is a sequence diagram illustrating an outline of traceability, to which the quality control system according to the second embodiment of the present invention is applied.

At Step S851, the article management server 11 transmits a search condition input screen G17 (FIG. 35(a)) to the client terminal 3, 4, or 5 in response to a transmission request from the client terminal 3, 4, or 5, whereby the client terminal 3, 4, or 5 displays the search condition input screen G17.

At Step S853, the client terminal 3, 4, or 5 inputs any of conditions ("date" or "determination") on the search condition input screen G17 and transmits the condition to the article management server 11.

At Step S855, the article management server 11 searches the database for a list of targets meeting the condition from the client terminal 3, 4, or 5 and transmits the list of targets to the client terminal 3, 4, or 5, whereby the client terminal 3, 4, or 5 displays the list of targets.

At Step S857, the client terminal 3, 4, or 5 selects a product as a display target and transmits the product to the article management server 11.

At Step S859, the article management server 11 transmits a traceability detail screen G19 (FIG. 35(b)) of the product selected by the client terminal 3, 4, or 5 to the client terminal 3, 4, or 5, whereby the client terminal 3, 4, or 5 displays the traceability detail screen G19.

At Step S861, the client terminal 3, 4, or 5 transmits a temperature history check instruction to the article management server 11 when a check button B25 for the temperature history illustrated in FIG. 36 is pressed.

At Step S863, the article management server 11 generates a temperature history screen G23 in response to the temperature history check instruction received from the client terminal 3, 4, or 5 and transmits the temperature history screen G23 to the client terminal 3, 4, or 5, whereby the client terminal 3, 4, or 5 can display the temperature history screen G23 (FIG. 37).

<Traceability List Screen>

FIG. 35(a) is a diagram illustrating the search condition input screen G17 being a list screen of traceability according to the second embodiment of the present invention, and FIG. 35(b) is a diagram illustrating a result of search refinement.

As illustrated in FIG. 35(a), input areas that enable input or selection of a hospital name, a date, and a determination are displayed on the search condition input screen G17 being a search condition input screen. When a hospital name is selected, a date is input, and the search button B21 is pressed, search processing is started.

Further, when an option displayed in an input area E1 for determination contents is further selected and a "search refinement" button B23 is pressed according to the designated condition, the traceability list screen G19 based on the search condition is displayed as illustrated in FIG. 35(b). The date, the product name, the transportation state, and the status are displayed in the horizontal direction as display items of the traceability list screen G19.

<Traceability Detail Screen>

FIG. 36 is a diagram illustrating a detail screen of traceability according to the second embodiment of the present invention.

As illustrated in FIG. 36, a hospital name and a tag number (No) are shown on the traceability detail screen G15 and the dates and times, the product names, the PDA names, the transportation states, the statuses, and the temperature deviation times (clock times) are further displayed.

When the list screen G13 illustrated in FIG. 19(b) is displayed and data shown on the list screen G13 is selected, the screen transitions to the detail screen and a task, a temperature, a status, and the like corresponding to the article can be referred to.

<Temperature History Screen>

FIG. 37 is a diagram illustrating a temperature history screen displayed on a user terminal, which is an example of transportation state data according to the second embodiment of the present invention.

An article temperature graph is displayed on the temperature history screen G23 illustrated in FIG. 37 when the "check temperature history" button B25 (FIG. 36) shown on the traceability (detail) screen is pressed.

Temperature history screens G23a and G23b are graphs corresponding to a lot number, a temperature history, and a tag number selected by a user, where the temperature value is represented on the vertical axis and the time is represented on the horizontal axis.

A range designation region G23b indicates a range from the date and time (the year, the month, the day, the hour, and the minute) of the start of data included in temperature history information corresponding to a lot number and a serial number to the date and time (the year, the month, the day, the hour, and the minute) of the end thereof.

With a mouse operation of moving a display-start-time cursor Cl shown in the range designation region G23b in FIG. 37, a display range can be designated to variably change the time axis (the horizontal axis) of the graph G23a, so that the flexibility of display related to the temperature history can be increased in the direction of the time axis.

<ER Diagram>

Figure 38:
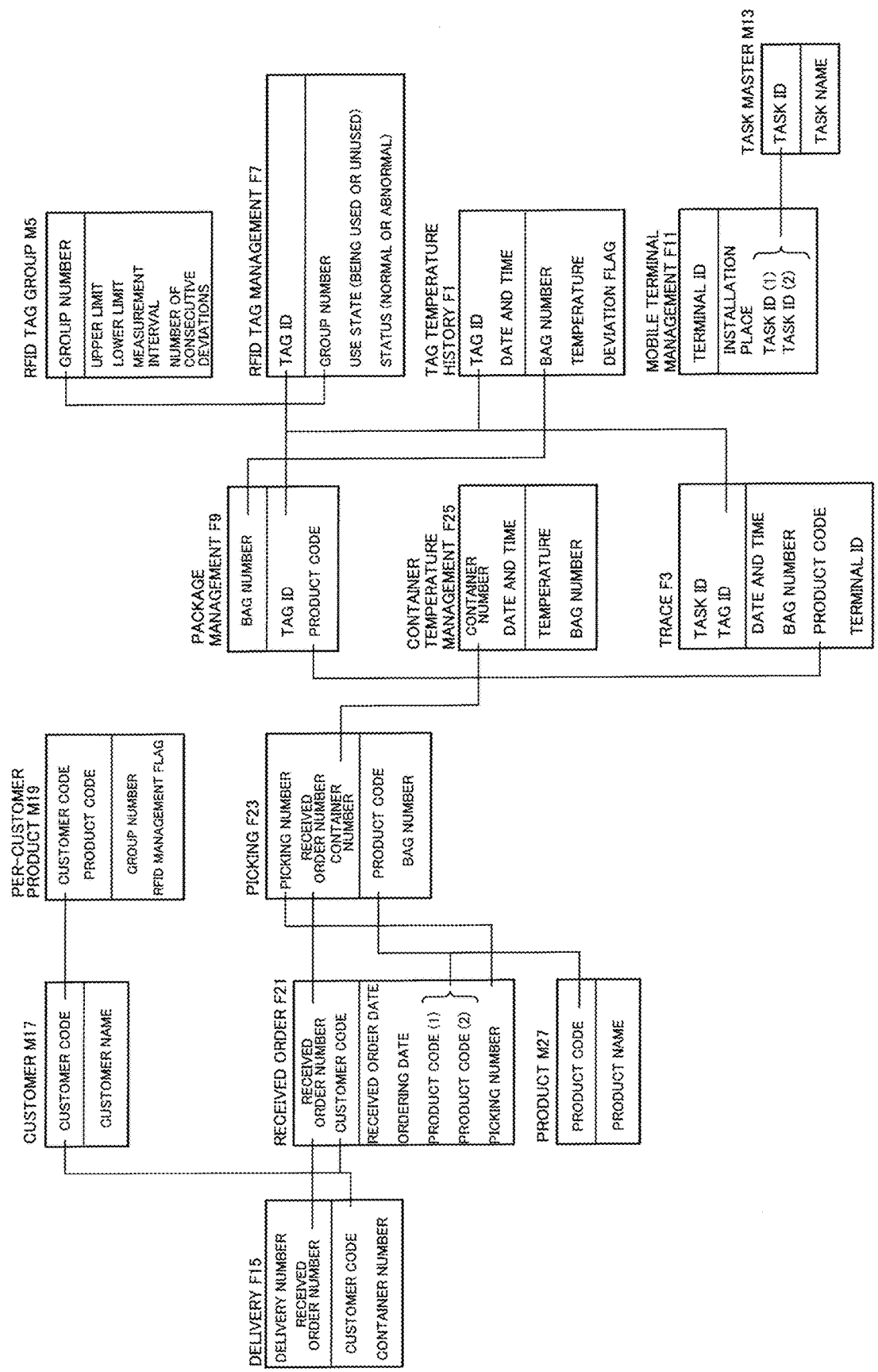
FIG. 38 is an ER diagram illustrating an association of files and masters processed by the article management server according to the second embodiment of the present invention.

FIG. 38 is an ER diagram illustrating an association of files and masters processed by the article management server according to the second embodiment of the present invention.

<Delivery F15>

The control unit 11b of the article management server 11 generates a delivery F15 by associating a customer code and a container ID with a delivery number and a received order number as information for delivery from the logistics center to a customer.

The control unit 11b of the article management server 11 extracts the delivery number and the received order number from the delivery F15 using the delivery number and the order number as keys and acquires the customer code and the container ID.

<Customer M17>

The control unit 11b of the article management server 11 generates a customer M17 by associating a customer name with a customer code through input on an input screen (not illustrated).

The control unit 11b of the article management server 11 extracts the customer code from the customer M17 using the customer code as a key and acquires the customer name.

<Per-Customer Product M19>

The control unit 11b of the article management server 11 generates the per-customer product M19 by associating a group number and an RFID management flag indicating whether to perform temperature management with the customer code and the product code, through input on an input screen (not illustrated).

The control unit 11b of the article management server 11 extracts the customer code and the product code from the per-customer product M19 using the customer code and the product code as keys and acquires the group number and the RFID management flag.

<Received Order F21>

The control unit 11b of the article management server 11 generates the received order F21 by associating a received order date, an ordering date, a product code, and a picking number (No) with the received order number and the customer code through input on an input screen (not illustrated) of the logistics management server 51.

The control unit 11b of the article management server 11 extracts the received order number and the customer code from the received order F21 using the received order number and the customer code as keys and acquires the received order date, the ordering date, the product code, and the picking number.

<Picking F23>

The control unit 11b of the article management server 11 generates the picking F23 by associating the product code and a bag ID with the picking number, the received order number, and the container number through input on an input screen (not illustrated) of the logistics management server 51.

The control unit 11b of the article management server 11 extracts the picking number, the received order number, and the container number from the picking F23 using the picking number, the received order number, and the container number as keys and acquires the product code and the bag ID.

<Product M27>

The control unit 11b of the article management server 11 generates the product M27 by associating a product name through input on an input screen (not illustrated).

The control unit 11b of the article management server 11 extracts the product code from the product M27 using the product code as a key and acquires the product name.

<Package Management F9>

The control unit 11b of the article management server 11 generates the package management file F9 by associating the tag ID of the RFID tag and the product code with the bag number of the bag with which the product is packaged, which is acquired from the mobile terminal 15.

The control unit 11b of the article management server 11 extracts the bag number from the package management file F9 using the bag number as a key and acquires the tag ID and the product code.

S<RFID Tag Management F7>

The control unit 11b of the article management server 11 generates the RFID tag management F7 by associating a tag group number, a use state, and a status with the tag ID, entering from an input screen (not illustrated).

The control unit 11b of the article management server 11 extracts the tag ID from the RFID tag management F7 using the tag ID as a key and acquires the tag group number, the use state, and the status.

<RFID Tag Group M5>

The control unit 11b of the article management server 11 generates the RFID tag group M5 by associating an upper temperature threshold, a lower temperature threshold, a measurement interval, and the number of consecutive deviations with the group number, entering from an input screen (not illustrated).

The control unit 11b of the article management server 11 extracts the group number from the RFID tag group M5 using the group number as a key and acquires the upper temperature threshold, the lower temperature threshold, the measurement interval, and the number of deviations.

With this RFID tag group M5, setting required for a deviation determination can be performed for each RFID tag.

<Container Temperature Management F25>

The control unit 11b of the article management server 11 acquires the temperature from the small terminal 55 attached to each of the containers and generates the container temperature management F25 by associating the temperature with the container number (No) and the date and time.

The control unit 11b of the article management server 11 extracts the container number and the date and time from the container temperature management F25 using the container number and the date and time as keys and acquires the temperature.

<Tag Temperature History F1>

The control unit 11b of the article management server 11 generates the tag temperature history F1 by associating the bag number, the temperature, and the deviation flag with the tag ID and the date and time acquired from the RFID tag 25 via the RFID reader 17 and the mobile terminal 15.

The control unit 11b of the article management server 11 extracts the tag ID and the date and time from the tag temperature history F1 using the tag ID and the date and time as keys and acquires the bag number, the temperature, and the deviation flag.

<Trace F3>

The control unit 11b of the article management server 11 generates the trace F3 by associating the date and time, the bag number, the product code, and the terminal ID with the task ID and the tag ID acquired from the mobile terminal 15.

The control unit 11b of the article management server 11 extracts the task ID and the tag ID from the trace F3 using the task ID and the tag ID as keys and acquires the date and time, the bag number, the product code, and the terminal ID.

The trace F3 is status information related to a task.

<Mobile Terminal Management F11>

The control unit 11b of the article management server 11 generates the mobile terminal management F11 by associating an installation place and a task ID with the terminal ID through input on an input screen (not illustrated).

The control unit 11b of the article management server 11 extracts the terminal ID from the mobile terminal management F11 using the terminal ID as a key and acquires the installation place and the task ID.

The mobile terminal management F11 is management information of the mobile terminal performing tasks.

<Task M13>

The control unit 11b of the article management server 11 generates the task M13 by associating a task name with the task ID through input on an input screen (not illustrated).

The control unit 11b of the article management server 11 extracts the task ID from the task M13 using the task ID as a key and acquires the task name.

The task M13 is task information from delivery from the logistics center to a customer until administration to patients.

Third Embodiment

<System Configuration Diagram>

Figure 39:
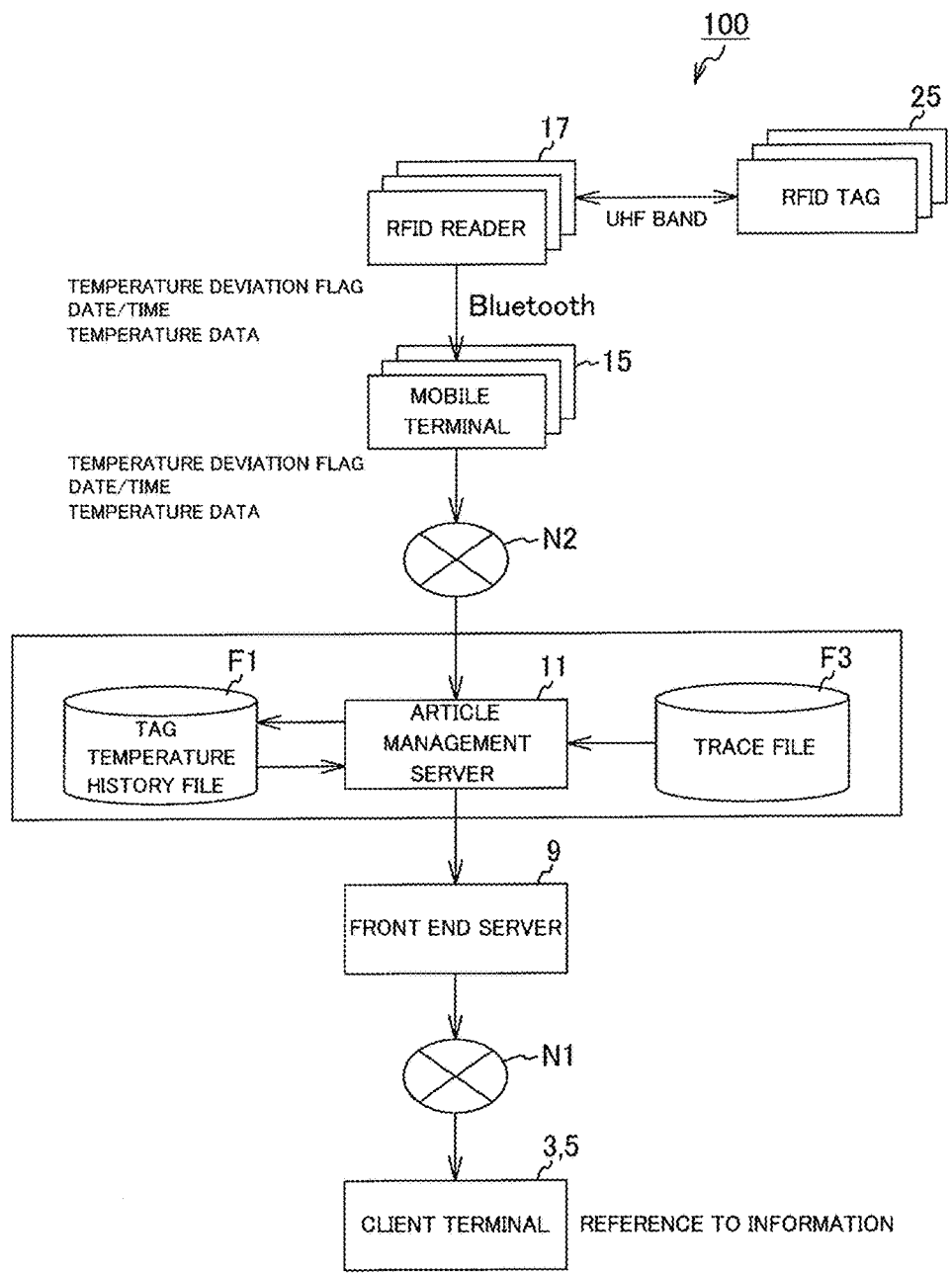
FIG. 39 is a system configuration diagram illustrating acquisition of a temperature deviation determination result on an article thar are generated by an article management server according to a third embodiment of the present invention.

FIG. 39 is a system configuration diagram illustrating acquisition of a temperature deviation determination result on an article thar are generated by an article management server according to a third embodiment of the present invention.

In the first embodiment and the second embodiment, the temperature data cannot be stored in the memory of the RFID tag (due to capacity shortage). Accordingly, the third embodiment is characterized in using an RFID tag that is capable of storing the temperature data therein.

A quality control system 100 includes the RFID tag 25, the RFID reader 17, the mobile terminal 15, the communication network N2, the article management server 11, the tag temperature history file F1, the trace file F3, the front end server 9, the communication network N1, and the client terminals 3 and 5.

The tag temperature history file F1 is stored in the database DB13, and a bag number, a temperature deviation flag F, and temperature data acquired from the RFID tag 25 via the RFID reader 17, the mobile terminal 15, the communication network N2, and the article management server 11 are stored to be associated with the tag ID and the date/time data.

The trace file F3 is stored in the database DB13, and the date/time data, the bag number, a product code, and a terminal ID are stored to be associated with the task ID and a tag ID.

Further, when update of the task ID being status information indicating task contents occurs, the article management server 11 generates the temperature history screen G23 by associating the temperature deviation data acquired from the tag temperature history file F1 with the task ID and the date/time data acquired from the trace file F3, and transmits the temperature history screen G23 to the front end server 9 to be transmitted to the client terminal 3 or 5 via the communication network N1.

<ER Diagram>

Figure 40:
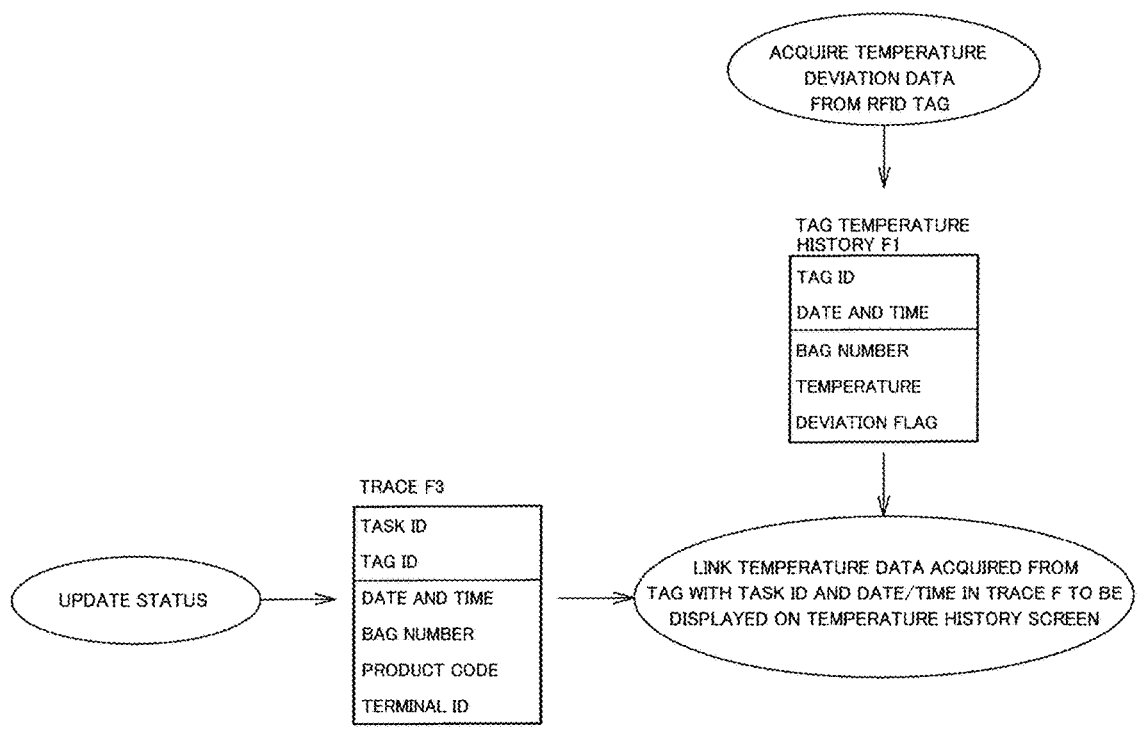
FIG. 40 is an ER diagram illustrating an association at a time of acquiring a temperature and a temperature deviation flag thar are generated by the article management server according to the third embodiment of the present invention.

FIG. 40 is an ER diagram illustrating an association at a time of acquiring a temperature and a temperature deviation flag that are generated by the article management server according to the third embodiment of the present invention.

The article management server 11 acquires the temperature deviation flag F, the temperature data, the bag number, the tag ID, and the date/time data from the RFID tag 25 via the RFID reader 17 and the mobile terminal 15 to generate the tag temperature history file F1 and stores the tag temperature history file F1 in the temperature storage unit 13a of the database DB13.

When the task ID that is received from the mobile terminal 15 and that is the status information indicating the task contents is updated, the article management server 11 updates the date/time data, the bag number, the product code, and the terminal ID that are stored in the trace file F3 in association with the tag ID.

Further, when update of the task ID being the status information indicating the task contents occurs, the article management server 11 generates the temperature history screen G23 by associating the temperature data acquired from the tag temperature history file F1 with the task ID and the date/time data acquired from the trace file F3.

<Summary of Actions and Effects of Aspects in the Present Embodiment>

<First Aspect>

The temperature measurement device 25A according to the present aspect is a temperature measurement device 25A that includes the temperature sensor 25d and that is accommodated in the container 21 along with the article 23, and is characterized in including the temperature deviation determination unit 25h that determines whether a temperature of the article 23 in the container 21 having been detected by the temperature sensor 25d at a predetermined measurement interval has deviated from a reference temperature range, the control unit 25g that enables a temperature deviation flag when the number of times the temperature of the article 23 in the container 21 has consecutively deviated from the reference temperature range exceeds a reference number as a result of determination by the temperature deviation determination unit 25h, and the notification unit 25f that notifies a fact that the temperature deviation flag has been enabled by the control unit 25g.

According to the present aspect, whether the temperature detected by the temperature sensor 25d accommodated in the container 21 along with the article 23 at a predetermined measurement interval has deviated from the reference temperature range is determined, the temperature deviation flag is enabled when the number of times the temperature of the article 23 in the container 21 has consecutively deviated from the reference temperature range exceeds the reference number, and a fact that the temperature deviation flag has been enabled is notified.

Therefore, the quality of pharmaceutical products until immediately before use can be checked.

<Second Aspect>

The temperature measurement device 25A according to the present aspect includes the storage unit 25i, and the control unit 25g is characterized in storing the temperature deviation flag in the storage unit 25i.

According to the present aspect, due to storage of the temperature deviation flag, a fact that the temperature deviation flag has been enabled can be notified. Therefore, the quality of the pharmaceutical products can be checked until immediately before use.

<Third Aspect>

The control unit 25g according to the present aspect is characterized in storing the temperature of the article in the container 21 detected by the temperature sensor 25d at a predetermined interval and/or the temperature deviation flag in the storage unit 25i.

According to the present aspect, due to storage of the temperature of the article in the container 21 detected at a predetermined interval and/or the temperature deviation flag, a fact that the temperature deviation flag has been enabled can be notified, and further the temperature of the article in the container 21 at the time of storage of the temperature deviation flag can be checked.

<Fourth Aspect>

The control unit 25g according to the present aspect is characterized in storing a temperature upper limit, a temperature lower limit, a measurement interval, and a reference number as monitoring conditions in the storage unit 25i, the temperature deviation determination unit 25h is characterized in determining, based on the temperature upper limit, the temperature lower limit, and the measurement interval acquired from the storage unit 25i, whether the temperature of the article 23 in the container 21 having been detected by the temperature sensor 25d at a predetermined measurement interval has deviated from a reference temperature range from the temperature upper limit to the temperature lower limit, and the control unit 25g is characterized in enabling the temperature deviation flag when the number of times the temperature of the article 23 in the container 21 has consecutively deviated from the reference temperature range exceeds the reference number as a result of determination by the temperature deviation determination unit 25h on the basis of the reference number acquired from the storage unit 25i.

According to the present aspect, whether the reference temperature range has been deviated can be determined on the basis of any monitoring conditions.

<Fifth Aspect>

The notification unit 25f according to the present aspect is characterized in being a light-emitting element that is turned on when the temperature deviation flag is enabled.

According to the present aspect, the light-emitting element is turned on when the temperature deviation flag is enabled. Therefore, consecutive deviations of the temperature of the article 23 in the container 21 from the reference temperature range can be visually checked.

<Sixth Aspect>

The temperature measurement device 25A according to the present aspect is characterized in including an RFID tag.

According to the present aspect, with use of the RFID tag as the temperature measurement device 25A, the quality of pharmaceutical products until immediately before use can be checked with a simple configuration.

<Seventh Aspect>

The quality control system 20 according to the present aspect is characterized in including the temperature measurement device 25A according to any one of the first to sixth aspects, and the refrigerator 27 that keeps the container 21 accommodating both the temperature measurement device 25A and the article 23 in a predetermined temperature range.

According to the present aspect, the quality of pharmaceutical products can be checked also during storage in the refrigerator 27.

<Eighth Aspect>

The quality control system 20 according to the present aspect is characterized in including the temperature measurement device 25A according to any one of the first to sixth aspects, and the mobile terminal 15 that communicates with the temperature measurement device 25A, and in that the temperature measurement device 25A includes the first communication unit 25e that transmits the temperature deviation flag to the mobile terminal 15 in response to a transmission request from the mobile terminal 15, and the mobile terminal 15 includes a fourth communication unit 15e that communicates with the temperature measurement device 25A, and the determination unit 15d that determines the article 23 is in an abnormal state when having received the enabled temperature deviation flag from the temperature measurement device 25A.

According to the present aspect, the quality of pharmaceutical products can be checked using the mobile terminal 15.

<Ninth Aspect>

The quality control system 20 according to the present aspect is characterized in including a communication relay device 17A that includes the second communication unit 17d communicating with the temperature measurement device 25A, and the third communication unit 17e communicating with the mobile terminal 15, and that relays communication between the temperature measurement device 25A and the mobile terminal 15 via the second communication unit 17d and the third communication unit 17e.

According to the present aspect, the quality of pharmaceutical products can be checked by the mobile terminal 15 via the communication relay device 17A that communicates with the temperature measurement device 25A.

<Tenth Aspect>

The quality control system 20 according to the present aspect is characterized in including the article management server 11 that communicates with the mobile terminal 15, in that the temperature measurement device 25A includes the storage unit 25i that stores therein a temperature of the article 23 in the container 21, a date and time, and the temperature deviation flag, and the first communication unit 25e that transmits a temperature of the article 23 in the container 21, a date and time, and the temperature deviation flag, read from the storage unit 25i to the mobile terminal 15 in response to a transmission request from the mobile terminal 15, and in that the article management server 11 includes the temperature storage unit 13a that stores therein a temperature of the article 23 in the container 21, a date and time, and the temperature deviation flag, received from the mobile terminal 15, and a quality data generation unit that generates quality data related to the article 23 in the container 21 on the basis of a temperature of the article 23, a date and time, and the temperature deviation flag acquired from the temperature storage unit 13a.

According to the present aspect, quality data related to the article 23 in the container 21 can be generated on the basis of the temperature of the article 23, the date and time, and the temperature deviation flag acquired from the temperature storage unit 13a.

<Eleventh Aspect>

The quality control system 20 according to the present aspect is characterized in including the printing device 19 that includes a sixth communication unit communicating with the mobile terminal 15 and that prints quality data received from the mobile terminal 15 via the sixth communication unit as a quality certification.

According to the present embodiment, the quality data received from the mobile terminal 15 can be printed by the printing device 19 as a quality certification.

<Twelfth Aspect>

The mobile terminal 15 according to the present aspect is characterized in including the seventh communication unit 15c that transmits a task status indicating a task state generated according to an operation to the mobile terminal 15, a temperature of the article 23 in the container 21, a date and time, and the temperature deviation flag to the article management server 11.

According to the present aspect, the task status, the temperature of the article 23 in the container 21, the date and time, and the temperature deviation flag acquired from the mobile terminal 15 can be managed by the article management server 11.

<Thirteenth Aspect>

The article management server 11 according to the present aspect is characterized in including the task data storage unit 13b that stores therein a task status received from the mobile terminal 15, a temperature storage unit 13b that stores therein a temperature of the article 23, a date and time, and a temperature deviation flag, and the task-state data generation unit 11d that generates task state data indicating a task status related to the article 23 on the basis of the task status acquired from the task data storage unit 13b, and the temperature of the article 23, the date and time, and the temperature deviation flag acquired from the temperature storage unit 13a.

According to the present aspect, the task state data indicating the task status related to the article 23 in the container 21 can be generated on the basis of the task status, the temperature of the article 23, the date and time, and the temperature deviation flag acquired from the mobile terminal 15.

<Fourteenth Aspect>

The article management server 11 according to the present aspect is characterized in including the ID management storage unit 13c that stores therein an ID of the temperature measurement device 25A, the number of the container 21, and a product code of the article 23, that are received from the mobile terminal 15, to be associated with each other.

According to the present aspect, the ID of the temperature measurement device 25A, the number of the container 21, the product code of the article 23 received from the mobile terminal 15 are stored in the article management server 11 to be associated with each other. Therefore, the temperature measurement device that has measured the temperature of pharmaceutical products, the container having kept the pharmaceutical products, and the product code of the pharmaceutical products can be checked.

<Fifteenth Aspect>

The article management server 11 according to the present aspect includes the monitoring condition storage unit 13d that stores therein a temperature upper limit, a temperature lower limit, a measurement interval, and a reference number as monitoring conditions of the temperature measurement device 25A, and an eighth communication unit 11a that transmits monitoring conditions acquired from the monitoring condition storage unit 13d to the mobile terminal 15, the mobile terminal 15 is characterized in including the fourth communication unit 15a that transmits the monitoring conditions received from the article management server 11 to the temperature measurement device 25A, and the control unit 25g of the temperature measurement device 25A is characterized in executing control to monitor a temperature of the article 23 in the container 21 on the basis of the monitoring conditions received from the mobile terminal 15.

According to the present aspect, the temperature measurement device 25A can be operated on the basis of monitoring conditions designated by the article management server 11.

<Sixteenth Aspect>

The article management server 11 according to the present aspect is characterized in including the barcode information generation unit 11e that generates a container number for identifying the container 21 accommodating both the article 23 and the temperature measurement device 25A as a barcode.

According to the present aspect, the container number can be checked by reading the barcode attached to the container 21 and the article can be tracked on the basis of identification of the container number.

REFERENCE SIGNS LIST

LED1 light-emitting diode, N1, N2, N3 communication network, 1 quality control system, 3, 4, 5 client terminal, 9 front end server, 11 article management server, 11a communication unit, 11b control unit, 11d task-state data generation unit, 11e barcode information generation unit, 13a temperature storage unit, 13b task data storage unit, 13c ID management storage unit, 13d monitoring condition storage unit, 15 mobile terminal, 15a communication unit, 15c communication unit, 15d determination unit, 17 RFID reader, 17A communication relay device, 17a CPU, 17b memory, 17c battery, 17d communication unit, 17e communication unit, 19 printing device, 20 quality control system, 21 container, 23 article, 25 RFID tag, 25A temperature measurement device, 25a CPU, 25b memory, 25c battery, 25d temperature sensor, 25e communication unit, 25f notification unit, 25g control unit, 25h temperature deviation determination unit, 25i storage unit, M27 product, 27 refrigerator, 43 medical facility ward, 45 medical facility storehouse, 50 quality control system, 51 logistics center, 51 logistics management server, delivery container, 55 small terminal, 100 quality control system

The invention claimed is:

1. A quality control system comprising a container used by a courier for delivering an article, the container containing the article, a temperature measurement device that includes a temperature sensor and that is accommodated in the container along with the article, and a refrigerator provided in a delivery destination that keeps a temperature of the container accommodating both the temperature measurement device and the article in a predetermined temperature range between a temperature upper limit and a temperature lower limit while the container is accommodated in the refrigerator, wherein the container, the temperature measurement device, and the refrigerator are separate from each other, and the container is a delivery container which is portable that can be moved in and out of the refrigerator, the temperature measurement device accommodated in the container in the refrigerator comprising:

a memory,
a CPU connected to the memory, and
an LED, wherein the CPU
obtaining a temperature data of the article in the container from the temperature sensor at a predetermined measurement interval;
determining whether the temperature data has deviated from the predetermined temperature range between the temperature upper limit and the temperature lower limit;
setting a temperature deviation flag as enabled in the memory when number of times the temperature data has consecutively deviated from the predetermined temperature range exceeds a reference number as a result of the determination; and
controlling the LED to be turned on and notify a user at the outside of the refrigerator that a surrounding environment temperature of the article has been in an abnormal state when the temperature deviation flag read from the memory is enabled,
wherein the quality control system comprises an RFID reader,
the temperature measurement device comprising an RFID tag includes a resonant circuit for communicating with the RFID reader via an antenna using a frequency in a UHF band and includes a communication unit for inputting and outputting communication signals between the RFID tag and the CPU, and
wherein the temperature measuring device which is in a state of being accommodated inside the refrigerator transmits a temperature deviation flag and a tag ID to the RFID reader via the RFID tag.

2. The quality control system according to claim 1, wherein
the CPU stores a temperature upper limit, a temperature lower limit, a measurement interval, and a reference number as monitoring conditions in the memory,
determines, based on the temperature upper limit, the temperature lower limit, and the measurement interval acquired from the memory, whether the temperature data of the article in the container having been detected by the temperature sensor at a predetermined measurement interval has deviated from a reference temperature range from the temperature upper limit to the temperature lower limit, and enables the temperature deviation flag in the memory when number of times that the temperature data of the article in the container has consecutively deviated from the reference temperature range exceeds the reference number as a result of the determination on a basis of the reference number acquired from the memory.

* * * * *